US009074091B2

(12) United States Patent
Kawazoe et al.

(10) Patent No.: US 9,074,091 B2
(45) Date of Patent: Jul. 7, 2015

(54) THERMOSETTING RESIN COMPOSITION, THERMOSETTING RESIN COMPOSITION FOR FIBER-REINFORCED COMPOSITE MATERIAL, PREPARED USING THE SAME, AND HONEYCOMB SANDWICH PANEL

(75) Inventors: Masayuki Kawazoe, Hiratsuka (JP); Tomohiro Ito, Hiratsuka (JP); Mitsuhiro Iwata, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 483 days.

(21) Appl. No.: 13/498,074

(22) PCT Filed: Sep. 22, 2010

(86) PCT No.: PCT/JP2010/066425
§ 371 (c)(1),
(2), (4) Date: Mar. 23, 2012

(87) PCT Pub. No.: WO2011/037144
PCT Pub. Date: Mar. 31, 2011

(65) Prior Publication Data
US 2013/0022780 A1    Jan. 24, 2013

(30) Foreign Application Priority Data

Sep. 25, 2009 (JP) ................................ 2009-221057
Oct. 5, 2009 (JP) ................................ 2009-231446

(51) Int. Cl.
B32B 27/20 (2006.01)
B32B 27/04 (2006.01)
B32B 27/38 (2006.01)
C08K 5/06 (2006.01)
C08K 5/41 (2006.01)
C08K 9/12 (2006.01)
C08L 63/00 (2006.01)
C08L 81/06 (2006.01)
C08J 5/24 (2006.01)
C08L 79/08 (2006.01)

(52) U.S. Cl.
CPC .......... *C08L 63/00* (2013.01); *Y10T 428/24149* (2015.01); *Y10T 428/2933* (2015.01); *C08L 79/08* (2013.01); *C08L 81/06* (2013.01); *C08J 5/24* (2013.01); *C08J 2363/00* (2013.01); *C08J 2481/06* (2013.01)

(58) Field of Classification Search
None
See application file for complete search history.

(56) References Cited

U.S. PATENT DOCUMENTS

| 3,532,662 | A | * | 10/1970 | Ansdell | 524/560 |
| 6,214,467 | B1 | * | 4/2001 | Edwards et al. | 428/407 |
| 6,429,157 | B1 | | 8/2002 | Kishi et al. | |
| 2001/0042593 | A1 | | 11/2001 | Zhou et al. | |
| 2002/0079052 | A1 | | 6/2002 | Zhou et al. | |
| 2003/0012954 | A1 | | 1/2003 | Schauer et al. | |
| 2003/0018103 | A1 | * | 1/2003 | Bardman et al. | 523/204 |
| 2003/0175045 | A1 | | 9/2003 | Hara | |
| 2004/0253444 | A1 | | 12/2004 | Schauer et al. | |
| 2008/0160860 | A1 | | 7/2008 | Kuroki et al. | |
| 2010/0178487 | A1 | | 7/2010 | Arai et al. | |

FOREIGN PATENT DOCUMENTS

| JP | S63-020319 | 1/1988 |
| JP | H05-148427 | 6/1993 |
| JP | 11-326606 | 11/1999 |
| JP | 2001031838 | 2/2001 |
| JP | 2003523441 | 8/2003 |
| JP | 2003268209 | 9/2003 |
| JP | 2005506394 | 3/2005 |
| JP | 2005507760 | 3/2005 |
| JP | 2006198920 | 8/2006 |
| JP | 2006236823 | 9/2006 |
| JP | 2006291218 | 10/2006 |
| JP | 2006328292 | 12/2006 |
| JP | 2007191633 | 8/2007 |
| JP | 2007-332234 | 12/2007 |
| JP | 2009242459 | 10/2009 |
| JP | 2010111864 | 5/2010 |
| JP | 2010195604 | 9/2010 |
| WO | WO 9902586 | 1/1999 |
| WO | WO 2005083002 | 9/2005 |
| WO | WO 2008018421 | 2/2008 |
| WO | WO2011037144 | 3/2011 |

OTHER PUBLICATIONS

Chinese Office Action dated Aug. 26, 2013, 9 pages, China.
Lin Zhao, Influence of Tertiary Component on Cure-Reaction-Induced Phase Separation in Thermoplastics/Epoxy Blends, Mar. 15, 2009, 25 pages, China.
PCT application PCT/JP2010/066425; Filed Sep. 22, 2010; The Yokohama Rubber Co., Ltd. et al; search report mailed Apr. 11, 2012.

* cited by examiner

*Primary Examiner* — Michael J Feely
(74) *Attorney, Agent, or Firm* — Thorpe North & Western

(57) ABSTRACT

An object of the present invention is to provide a thermosetting resin composition having superior toughness. The thermosetting resin composition of the present invention includes a thermosetting resin, and an adsorbing filler in which a thermoplastic resin C is adsorbed on a filler, wherein an adsorption coefficient that is greater than 0 and less than or equal to 0.8, defined by Formula 1 is satisfied. Formula 1: Adsorption coefficient={Amount (parts by mass) of the thermoplastic resin C adsorbed on 100 parts by mass of the filler/specific gravity of the thermoplastic resin C}/DBP oil absorption (mL/100 g) of the filler.

21 Claims, 3 Drawing Sheets

104

105

THERMOSETTING RESIN COMPOSITION, THERMOSETTING RESIN COMPOSITION FOR FIBER-REINFORCED COMPOSITE MATERIAL, PREPARED USING THE SAME, AND HONEYCOMB SANDWICH PANEL

TECHNICAL FIELD

The present invention relates to a thermosetting resin composition, a thermosetting resin composition for a fiber-reinforced composite material, a prepreg using the same, and a honeycomb sandwich panel.

BACKGROUND

Conventionally, methods have been proposed for covering a base material with a Lower Critical Solution Temperature (LCST) polymer or an Upper Critical Solution Temperature (UCST) polymer (Patent Documents 1 and 2). Additionally, to-date, the present applicant has proposed a composition including a thermosetting resin, a thermoplastic resin, a curing agent, an inorganic filler, and the like (Patent Reference 3).

Moreover, achieving a high toughness of the matrix resin and resin flow characteristics are extremely important to a self-adhesive prepreg capable of improving panel productivity by eliminating the need to apply a film adhesive when manufacturing a honeycomb panel. Thus, conventionally, research into achieving a high toughness of an epoxy resin using a rubber or a super engineering plastic (thermoplastic resin) has been carried out (e.g. see Patent Documents 4 to 11).

PRIOR ART DOCUMENTS

Patent Documents

Patent Document 1: Japanese Unexamined Patent Application Publication (translation of PCT application) No. 2003-523441
Patent Document 2: Japanese Unexamined Patent Application Publication (translation of PCT application) No. 2005-507760
Patent Document 3: Japanese Unexamined Patent Application Publication No. 2007-191633
Patent Document 4: International Publication No. WO1999/02586
Patent Document 5: International Publication No. WO2005/83002
Patent Document 6: Japanese Unexamined Patent Application Publication No. 2006-328292
Patent Document 7: Japanese Unexamined Patent Application Publication No. 2006-198920
Patent Document 8: US Patent Application Publication No. 2002/0079052
Patent Document 9: Japanese Unexamined Patent Application Publication (translation of PCT application) No. 2005-506394
Patent Document 10: Japanese Unexamined Patent Application Publication No. 2006-291218
Patent Document 11: Japanese Unexamined Patent Application Publication No. 2001-31838

SUMMARY

Problem to be Solved by the Invention

However, the present inventors discovered that there was room for improvement in the toughness of a cured product obtained from a composition including a thermosetting resin, a thermoplastic resin, a curing agent, and an inorganic filler. Additionally, the present inventors discovered that the toughness of a cured product obtained from a composition including a thermosetting resin, a filler having a surface thereof completely covered with a thermoplastic resin, and a curing agent was low.

Moreover, in a formulated system using a liquid rubber, a sufficiently high toughness of the epoxy resin cannot be obtained even when adding a large amount because the molecular weight of the rubber itself is low. Furthermore, the present inventors discovered that it is necessary to add from 40 to 50 parts by weight, or more, of an engineering plastic (thermoplastic resin) per 100 parts by weight of an epoxy resin in order to achieve sufficient expression of self-adhesion. Because the engineering plastic in the phase structure of the cured resin forms a continuous phase, in cases where the cured resin is exposed to a solvent, this engineering plastic continuous phase will be prone to being negatively affected by the solvent and, as a result, solvent resistance of the composite material will decline.

Thus, an object of the present invention is to provide a thermosetting resin composition with superior toughness.

Another object of the present invention is to provide a thermosetting resin (epoxy resin) composition for a fiber-reinforced composite material that will become a cured product with superior toughness and solvent resistance.

Means of Solving the Problem

As a result of diligent research into a solution for the objects described above, the present inventors discovered that a thermosetting resin composition obtained by dispersing an adsorbing filler, in which a thermoplastic resin is adsorbed on a filler, in a thermosetting resin; wherein an adsorption coefficient that is greater than 0 and less than or equal to 0.8, expressed by a specified formula, is satisfied, has superior toughness. Thus, they arrived at the present invention.

Additionally, the present inventors discovered an epoxy resin composition for a fiber-reinforced composite material including an epoxy resin A, a thermoplastic resin B, an adsorbing filler in which a thermoplastic resin C is adsorbed on a filler, and a curing agent; wherein an adsorption coefficient that is greater than 0 and less than or equal to 0.8, defined by a specified formula, is satisfied and, the morphology of a cured form thereof is such that at least the epoxy resin A forms a continuous phase and the adsorbing filler is dispersed in at least this continuous phase. The present inventors discovered that this epoxy resin composition for a fiber-reinforced composite material becomes a cured product having superior toughness and solvent resistance and, thus, arrived at the present invention.

Specifically, the present invention provides the following 1 to 18.

1. A thermosetting resin composition including: a thermosetting resin and an adsorbing filler in which a thermoplastic resin C is adsorbed on a filler; wherein an adsorption coefficient that is greater than 0 and less than or equal to 0.8, defined by Formula 1 below, is satisfied.

Adsorption coefficient=Amount (parts by mass) of the thermoplastic resin $C$ adsorbed on 100 parts by mass of the filler/specific gravity of the thermoplastic resin $C$/DBP oil absorption (mL/100 g) of the filler.      Formula 1

2. The thermosetting resin composition described in 1, wherein the thermosetting resin includes at least one selected from the group consisting of epoxy resins, phenolic resins, urea resins, melamine resins, unsaturated polyester resins, and thermosetting polyimide and benzoxazine resins.

3. The thermosetting resin composition described in 1 or 2, wherein a form of the filler is at least one selected from the group consisting of spherical, granular, and irregular.

4. The thermosetting resin composition described in any of 1 to 3, wherein the thermoplastic resin C is at least one selected from the group consisting of polyethersulfone, polysulfone, and polyetherimide.

5. The thermosetting resin composition described in any of 1 to 4, wherein the thermoplastic resin C has a functional group that reacts with the thermosetting resin.

6. The thermosetting resin composition described in any of 1 to 5, wherein an amount of the adsorbing filler is from 0.1 to 100 parts by mass per 100 parts by mass of the thermosetting resin.

7. The thermosetting resin composition described in any of 1 to 6, wherein the DBP oil absorption is from 10 to 1,000 mL/100 g.

8. The thermosetting resin composition described in any of 1 to 7, wherein the adsorbing filler is dispersed in the thermosetting resin.

9. The thermosetting resin composition described in any of 1 to 8, further including a curing agent.

10. The thermosetting resin composition described in any of 1 to 9, further including a thermoplastic resin B.

11. The thermosetting resin composition described in 10, wherein the thermoplastic resin B has a functional group that reacts with the thermosetting resin.

12. The thermosetting resin composition described in any of 1 to 11, wherein the thermosetting resin is an epoxy resin A and, furthermore, includes a thermoplastic resin B and a curing agent.

13. The thermosetting resin composition described in any of 1 to 12, further including a solid resin D and/or an elastomer that is solid at room temperature.

14. A method of manufacturing the thermosetting resin composition described in any of 1 to 8, including: a resin mixing process in which a solution including the thermosetting resin, the thermoplastic resin C, and the filler, wherein the thermoplastic resin C phase separates from the thermosetting resin at a temperature less than or equal to a UCST or greater than or equal to an LOST, is formed into a one-phase region mixed solution at a temperature exceeding the UCST or lower than the LCST; and an adsorption process in which the resin mixed solution is adjusted to a temperature less than or equal to the UCST or greater than or equal to the LOST, the thermoplastic resin C phase separates from the thermosetting resin and the resin mixed solution constitutes a two-phase region, and the phase separated thermoplastic resin C is adsorbed on the filler and becomes an adsorbing filler.

15. A method of manufacturing the thermosetting resin composition described in 9, including: a resin mixing process in which a solution including the thermosetting resin, the thermoplastic resin C, and the filler, wherein the thermoplastic resin C phase separates from the thermosetting resin at a temperature less than or equal to a UCST or greater than or equal to an LOST, is formed into a one-phase region mixed solution at a temperature exceeding the UCST or lower than the LOST;

an adsorption process in which the resin mixed solution is adjusted to a temperature less than or equal to the UCST or greater than or equal to the LOST, the thermoplastic resin C phase separates from the thermosetting resin and the resin mixed solution becomes a two-phase region, the phase separated thermoplastic resin C is adsorbed on the filler and becomes an adsorbing filler, and an adsorbing filler mixture including the adsorbing filler is obtained; and a curing agent mixing process in which the adsorbing filler mixture and the curing agent are mixed.

16. A thermosetting resin composition for fiber-reinforced composite material wherein a thermosetting resin composition described in any of 1 to 13 or a thermosetting resin composition obtained by a method of manufacturing a thermosetting resin composition described in 14 or 15 is used for a fiber-reinforced composite material.

17. A prepreg obtained by combining reinforced fiber and the thermosetting resin composition for fiber-reinforced composite material described in 16.

18. A honeycomb sandwich panel obtained by layering and curing a honeycomb core and the prepreg described in 17.

Effect of the Invention

The thermosetting resin composition of the present invention has superior toughness.

According to the method of manufacturing a thermosetting resin composition of the present invention, a thermosetting resin composition having superior toughness can be obtained.

The thermosetting resin (epoxy resin) composition for a fiber-reinforced composite material of the present invention becomes a cured product having superior toughness and solvent resistance. The prepreg of the present invention and the honeycomb sandwich panel of the present invention have superior toughness and solvent resistance.

DETAILED DESCRIPTION

Figure 1A:
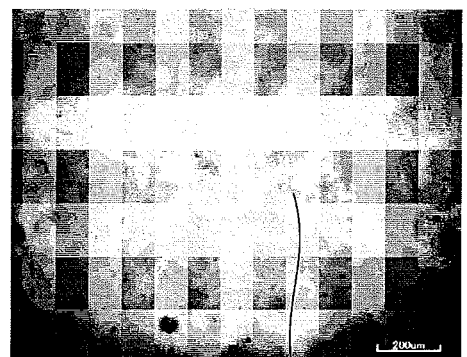
FIGS. 1A to 1E are photographs taken of adsorbing filler-containing mixtures obtained in the examples, using a confocal microscope with a 10× objective lens.
Figure 1B:
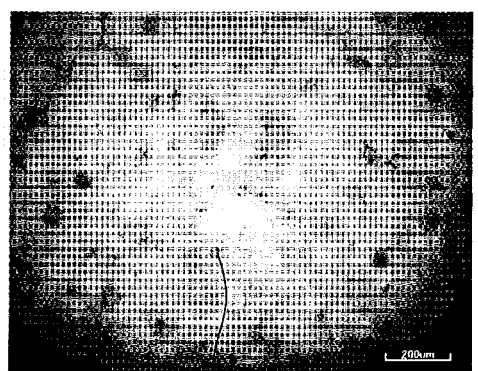
Figure 1C:
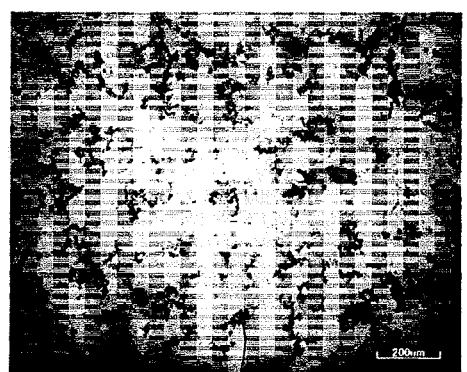
Figure 1D:
Figure 1E:
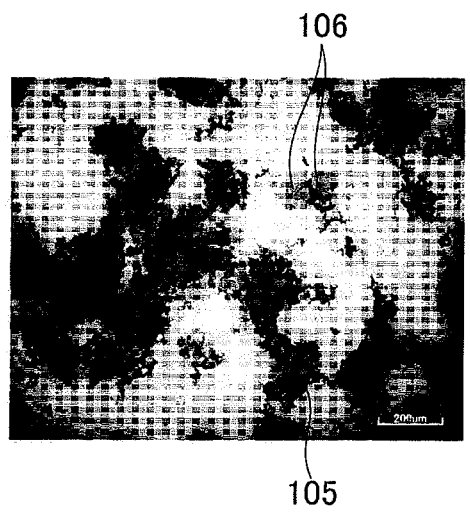

The present invention is described in detail below.

A thermosetting resin composition of the present invention is a composition including:

a thermosetting resin and an adsorbing filler in which a thermoplastic resin C is adsorbed on a filler; wherein an adsorption coefficient that is greater than 0 and less than or equal to 0.8, defined by Formula 1 below, is satisfied.

Adsorption coefficient=Amount (parts by mass) of the thermoplastic resin $C$ adsorbed on 100 parts by mass of the filler/specific gravity of the thermoplastic resin $C$/DBP oil absorption (mL/100 g) of the filler.     Formula 1

Note that in cases where the thermosetting resin composition of the present invention or a thermosetting resin composition obtained via a method of manufacturing a thermosetting resin composition of the present invention is used for a fiber-reinforced composite material, the thermosetting resin composition of the present invention or the thermosetting resin composition obtained via the method of manufacturing a thermosetting resin composition of the present invention is a thermosetting resin composition for a fiber-reinforced composite material of the present invention. Additionally, in the present specification, the "thermosetting resin composition for a fiber-reinforced composite material of the present invention" includes an epoxy resin composition for a fiber-reinforced composite material. In cases where a matter related to the thermosetting resin composition of the present invention and a matter related to the thermosetting resin composition for a fiber-reinforced composite material (epoxy resin composition for a fiber-reinforced composite material) of the present invention overlap, in the present specification, said matter will be described together for both the thermosetting resin composition of the present invention and the thermosetting resin composition for a fiber-reinforced composite material (epoxy resin composition for a fiber-reinforced composite material) of the present invention.

The thermosetting resin is described below.

The thermosetting resin used in the thermosetting resin composition of the present invention is not particularly limited. Examples thereof include epoxy resins, phenolic resins, urea resins, melamine resins, unsaturated polyester resins, thermosetting polyimide and benzoxazine resins, polyurethane resins, and silicone resins.

From the perspectives of obtaining superior mechanical properties (e.g. toughness), heat resistance, and solvent resistance, the thermosetting resin preferably includes at least one selected from the group consisting of epoxy resins, phenolic resins, urea resins, melamine resins, unsaturated polyester resins, thermosetting polyimide, and benzoxazine resins.

The various thermosetting resins are not particularly limited, and examples thereof include conventionally known products. A single thermosetting resin can be used or a combination of two or more thermosetting resins can be used.

The epoxy resin that the thermosetting resin composition of the present invention can include is not particularly limited, provided that it is a compound that has two or more epoxy groups. Examples thereof include conventionally known products. Examples of the epoxy resin (epoxy resin I) include: bifunctional glycidyl ether-type epoxy resins including biphenyl-type resins such as bisphenol A, bisphenol F, brominated bisphenol A, hydrogenated bisphenol A, bisphenol S, and bisphenol AF type resins; polyglycidyl ether-type epoxy resins; glycidyl ester epoxy resins obtained from a synthetic fatty acid such as diglycidyl tetrahydrophthalate and dimer acid; aromatic epoxy resins having a glycidyl amino group such as N,N,N',N'-tetraglycidyl diaminodiphenyl methane (TGDDM); alicyclic epoxy resins; epoxy resins having a sulfur atom on the epoxy resin backbone; urethane-modified epoxy resins having urethane bonds; and rubber-modified epoxy resins including polybutadiene, liquid polyacrylonitrile-butadiene rubber, or acrylonitrile butadiene rubber (NBR).

Of these, from the perspectives of workability and heat resistance of the cured product, the epoxy resin included in the thermosetting resin composition of the present invention is preferably a bisphenol A-type epoxy resin, a bisphenol F-type epoxy resin, or a glycidyl ester epoxy resin.

Additionally, the epoxy resin that can be included in the thermosetting resin composition of the present invention is referred to as "epoxy resin A", and a description of this epoxy resin A is given below. An epoxy resin A included in the epoxy resin composition for a fiber-reinforced composite material is synonymous with the epoxy resin A used in the thermosetting resin composition of the present invention. The epoxy resin A included in the thermosetting resin composition of the present invention is referred to as "epoxy resin A" in the present specification.

The epoxy resin A included in the thermosetting resin composition (the epoxy resin composition for a fiber-reinforced composite material) of the present invention is not particularly limited, provided that it is a compound that has two or more epoxy groups. Examples thereof include conventionally known products.

From the perspective obtaining superior handling and workability such as resin impregnatability into reinforced fiber, the epoxy resin A preferably includes an epoxy resin a-1 having a viscosity at 25° C., measured using an E-type or B-type viscometer, of not more than 2,000 mPa·s, and more preferably having a viscosity from 100 to 2,000 mPa·s.

Examples of the epoxy resin a-1 include glycidyl amine-type epoxy resins such as tetraglycidyl-m-xylylenediamine and 1,3-bis(N,N-diglycidyl aminomethyl)cyclohexane; aminophenol-type epoxy resins such as triglycidyl-p-aminophenol and triglycidyl-p-aminocresol; resorcinol-type epoxy resins such as diglycidylresorcinol; and glycidyl ester epoxy resins such as diglycidyl hexahydrophthalate and diglycidyl tetrahydrophthalate.

Of these, from the perspectives of obtaining superior heat resistance, toughness, and solvent resistance, and also obtaining superior handling and workability such as resin impregnatability into reinforced fiber, the epoxy resin a-1 is preferably an aminophenol-type epoxy resin or a resorcinol-type epoxy resin.

A single epoxy resin a-1 can be used or a combination of two or more epoxy resins a-1 can be used.

From the perspectives of obtaining superior toughness and solvent resistance, the epoxy resin A can further include an epoxy resin a-2 having a viscosity at 25° C. that exceeds 2,000 mPa·s.

From the perspectives of obtaining superior toughness and solvent resistance, and handling and workability such as resin impregnatability into reinforced fiber not being negatively affected, the viscosity at 25° C. of the epoxy resin a-2 is preferably not more than 10,000 mPa·s.

Examples of the epoxy resin a-2 are the same as the examples listed above for the epoxy resin I.

Of these, from the perspectives of workability and heat resistance of the cured product, the epoxy resin a-2 is preferably a bisphenol A-type epoxy resin or a bisphenol F-type epoxy resin.

A single epoxy resin a-2 can be used or a combination of two or more epoxy resins a-2 can be used.

From the perspectives of obtaining superior heat resistance, toughness, and solvent resistance, and also obtaining superior handling and workability such as resin impregnatability into reinforced fiber, an amount of the epoxy resin a-1 is preferably from 30 to 100 mass % of the epoxy resin A, and more preferably is from 50 to 100 parts by mass.

The thermoplastic resin C is described below.

In the present invention, the thermoplastic resin C is an adsorbing filler in which the thermoplastic resin C is adsorbed on a filer. Note that a thermoplastic resin C used in the epoxy resin composition for a fiber-reinforced composite material corresponds to the thermoplastic resin C used in the thermosetting resin composition of the present invention.

The thermoplastic resin C used in the thermosetting resin composition of the present invention (synonymous with the thermoplastic resin C used in the epoxy resin composition for a fiber-reinforced composite material) is not particularly limited. Examples thereof include polyethersulfone, polysulfone, polyetherimide, polyethylene terephthalate, polybutylene terephthalate, polyphenylene oxide, polycarbonate, and the like.

Of these, from the perspectives of obtaining superior mechanical properties (especially toughness) and excellent balance between heat resistance and solvent resistance, the thermoplastic resin C (thermoplastic resin B; the thermoplastic resin B is described hereinafter) is preferably at least one selected from the group consisting of polyethersulfone, polysulfone, and polyetherimide.

Additionally, from the perspective of obtaining superior mechanical properties, particularly the properties of toughness and solvent resistance, the thermoplastic resin C (the thermoplastic resin B) preferably has a functional group that reacts with the thermosetting resin (the epoxy resin A).

Examples of the functional group that the thermoplastic resin C (the thermoplastic resin B) can have include hydroxy groups, amino groups, imino groups, aldehyde groups, carboxy groups, epoxy groups, and isocyanate groups.

From the perspective of obtaining superior toughness and solvent resistance of the properties described above, when the thermosetting resin is an epoxy resin (when the thermosetting resin composition of the present invention is an epoxy resin composition; in cases where the thermosetting resin is an epoxy resin and the composition is used for a fiber-reinforced composite material, the composition corresponds to the epoxy resin composition for a fiber-reinforced composite material), the functional group that the thermoplastic resin C (the thermoplastic resin B) has is preferably a hydroxy group, an amino group, an epoxy group, or an isocyanate group.

From the perspective of obtaining superior toughness and solvent resistance of the properties described above, when the thermosetting resin is a benzoxazine resin, the functional group that the thermoplastic resin has is preferably a hydroxy group, an amino group, an epoxy group, or an isocyanate group.

From the perspective of obtaining excellent balance between mechanical properties (especially toughness), heat resistance, and solvent resistance, the thermoplastic resin C (the thermoplastic resin B) is preferably a polymer having an upper critical solution temperature (UCST) or a lower critical solution temperature (LCST) in the thermosetting resin (the epoxy resin A). The UCST or the LOST can be appropriately adjusted based on the types and amounts of the thermoplastic resin C (the thermoplastic resin B) and the thermosetting resin (the epoxy resin A).

The thermoplastic resin C (the thermoplastic resin B) having an LCST with respect to the thermosetting resin (the epoxy resin A) can be phase separated from the thermosetting resin (the epoxy resin A) at a temperature greater than or equal to the LCST, after combining the thermosetting resin (the epoxy resin A) and the thermoplastic resin C (the thermoplastic resin B) at a temperature lower than the LOST.

From the perspective of obtaining excellent balance between mechanical properties (especially toughness), heat resistance, and solvent resistance, the combining of the thermoplastic resin C (the thermoplastic resin B) having an LCST with respect to the thermosetting resin and the thermosetting resin is preferably a combination of at least one thermoplastic resin selected from the group consisting of polyethersulfone and polysulfone, and at least one thermosetting resin selected from the group consisting of an epoxy resin (the epoxy resin A), a phenolic resin, and a benzoxazine resin. The LCST can be adjusted to about 150° C. in a case (shown in Working Example I) where 30 parts by mass of a polyethersulfone thermoplastic resin and 100 parts by mass of a bisphenol A-type epoxy thermosetting resin are combined.

The thermoplastic resin C (the thermoplastic resin B) having a UCST with respect to the thermosetting resin (the epoxy resin A) can be phase separated from the thermosetting resin (the epoxy resin A) at a temperature less than or equal to the UCST, after combining the thermosetting resin (the epoxy resin A) and the thermoplastic resin C (the thermoplastic resin B) at a temperature higher than the UCST.

From the perspective of obtaining excellent balance between mechanical properties (especially toughness), heat resistance, and solvent resistance, the combining of the thermoplastic resin C (the thermoplastic resin B) having a UCST with respect to the thermosetting resin and the thermosetting resin is preferably a combination of a thermoplastic resin such as polyetherimide and a thermosetting resin such as an epoxy resin (the epoxy resin A). The UCST can be adjusted to about 50° C. in a case (shown in Working Example I) where 15 parts by mass of a polyetherimide thermoplastic resin and 100 parts by mass of a bisphenol A-type epoxy thermosetting resin are combined. Additionally, the UCST can be adjusted to about 100° C. in a case (shown in Working Example II) where 30 parts by mass of a polyetherimide thermoplastic resin and 100 parts by mass of a glycidyl ester epoxy thermosetting resin are combined.

From the perspectives of obtaining superior mechanical properties (especially toughness), excellent balance between heat resistance and solvent resistance, and suppressing the viscosity of the resin composition from rising more than necessary, a weight-average molecular weight of the thermoplastic resin C (the thermoplastic resin B) is preferably from 3,000 to 1,000,000 and more preferably from 20,000 to 100,000.

A single thermoplastic resin C (thermoplastic resin B) can be used or a combination of two or more thermoplastic resins C (thermoplastic resins B) can be used.

From the perspective of obtaining excellent balance between mechanical properties (especially toughness), heat resistance, and solvent resistance, an amount of the thermoplastic resin C used is preferably an amount per 100 parts by mass of a filler where an adsorption coefficient that is greater than 0 and less than or equal to 0.8, and more preferably from 0.1 to 0.7, defined by Formula 1, is satisfied.

A description of the filler is given below.

The filler used in the thermosetting resin composition (the epoxy resin composition for a fiber-reinforced composite material) of the present invention is not particularly limited. Examples thereof include inorganic fillers and organic fillers. From the perspective of obtaining superior toughness, inorganic fillers are preferable.

Examples of the inorganic filler include carbon black, silica (e.g. fumed silica and wet silica), carbon nanotubes, silica sand, calcium silicate, mica, talc, alumina, montmorillonite, aluminum nitride, boron nitride, calcium carbonate, and titanium oxide.

Of these, from the perspectives of obtaining superior toughness, superior solvent resistance, and ease of adsorption of the thermoplastic resin C, the inorganic filler is preferably silica (fumed silica), carbon black, or carbon nanotubes.

A form of the filler is not particularly limited, and examples thereof include spherical, granular, and irregular forms (fillers having an irregular or amorphous form). From the perspective of ease of adsorption of the thermoplastic resin C, the form of the filler is preferably at least one selected from the group consisting of spherical, granular, and irregular.

In the present invention, from the perspective of adsorbing a sufficient amount of the thermoplastic resin C, a DBP oil absorption (dibutyl phthalate oil absorption) of the filler is preferably from 10 to 1,000 mL/100 g and more preferably from 50 to 500 mL/100 g.

From the perspective of improving adsorption of the thermoplastic resin C, an average primary particle size of the filler is preferably from 5 to 100 nm.

A single filler can be used or a combination of two or more fillers can be used.

From the perspective of obtaining excellent balance between mechanical properties (especially toughness), heat resistance, and solvent resistance, an amount of the filler used is preferably from 1 to 100 parts by mass and more preferably from 1 to 10 parts by mass per 100 parts by mass of the thermosetting resin (the epoxy resin A included in the epoxy resin composition for a fiber-reinforced composite material).

A description of the adsorbing filler is given below.

The adsorbing filler included in the thermosetting resin composition of the present invention is an adsorbing filler in which a thermoplastic resin is adsorbed on a filler. The adsorbing filler included in the thermosetting resin composition of the present invention corresponds to an adsorbing filler included in the epoxy resin composition for a fiber-reinforced composite material.

In the present invention, "adsorption" refers to an phenomenon in which a concentration of the thermoplastic resin C (the thermoplastic resin C included in the epoxy resin composition for a fiber-reinforced composite material) at an interface between the thermosetting resin (e.g. the epoxy resin or the epoxy resin A) and the filler becomes greater than that within the thermosetting resin. Examples of adsorption include physisorption and chemisorption. From the perspective promoting partial adsorption at the filler surface, the adsorption is preferably physisorption.

An example of a combination of the thermoplastic resin C (the thermoplastic resin C used in the epoxy resin composition for a fiber-reinforced composite material) and the filler constituting the adsorbing filler is a combination of at least one type of thermoplastic resin selected from the group consisting of polyethersulfone, a polyethersulfone having a hydroxy group, polysulfone, and polyetherimide, and silica (fumed silica), carbon black, or carbon nanotubes.

A single adsorbing filler can be used or a combination of two or more adsorbing fillers can be used.

The thermosetting resin composition of the present invention has an adsorption coefficient defined by Formula 1 that is greater than 0 and less than or equal to 0.8.

Adsorption coefficient=Amount (parts by mass) of the thermoplastic resin C adsorbed on 100 parts by mass of the filler/specific gravity of the thermoplastic resin C/DBP oil absorption (mL/100 g) of the filler. Formula 1

In the present invention, the "adsorption coefficient defined by Formula 1" is a value of a ratio of the volume of a thermosetting resin that 100 parts by mass of a particular filler adsorbed to the volume of DBP that the same amount of the same filler could absorb.

Specifically, Formula 1 can be expressed as the following:

$$\text{Adsorption coefficient} = \frac{\left(\dfrac{\text{Amount of the thermoplastic resin } C \text{ adsorbed on 100 parts by mass of the filler}}{\text{Specific gravity of thermoplastic resin } C}\right)}{DBP \text{ oil absorption of the filler}} \quad \text{Formula 1}$$

A case where the adsorption coefficient is equal to 1 indicates a state in which a surface of the filler is completely covered by the thermoplastic resin C.

Cases where the adsorption coefficient is greater than 0 and less than or equal to 0.8 indicate a state in which the surface of the filler is partially covered by the thermoplastic resin C, and that the surface of the filler is not completely covered by the thermoplastic resin C. As a result, if the thermosetting resin composition (the epoxy resin composition for a fiber-reinforced composite material) of the present invention is used, a thermosetting resin having superior toughness can be obtained as a cured product.

From the perspective of obtaining excellent balance between mechanical properties (especially toughness), heat resistance, and solvent resistance, the adsorption coefficient is preferably from 0.1 to 0.7, and more preferably from 0.2 to 0.6.

From the perspective of obtaining excellent balance between mechanical properties (especially toughness), heat resistance, and solvent resistance, an amount of the adsorbing filler is preferably from 0.1 to 100 parts by mass and more preferably from 1 to 20 parts by mass per 100 parts by mass of the thermosetting resin (the epoxy resin A included in the epoxy resin composition for a fiber-reinforced composite material).

A method of manufacturing the adsorbing filler is not particularly limited. For example, the adsorbing filler can be manufactured according to a method of manufacturing a thermosetting resin composition of the present invention described hereinafter.

The thermosetting resin composition of the present invention can further include a thermoplastic resin B, in addition to the adsorbing filler. Note that the thermoplastic resin B included in the epoxy resin composition for a fiber-reinforced composite material corresponds to a thermoplastic resin B that the thermosetting resin composition of the present invention can further include.

The thermoplastic resin B (the thermoplastic resin B included in the epoxy resin composition for a fiber-reinforced composite material; in the present specification, the thermoplastic resin B that can be further included is referred to as the "thermoplastic resin B") that can further be included in the thermosetting resin composition is not particularly limited. Examples thereof include the products listed above.

From the perspective of obtaining superior dissolution workability in the epoxy resin A, a form of the thermoplastic resin B that the thermosetting resin composition of the present invention can further include is preferably particulate. From the perspective of obtaining superior dissolution workability in the thermosetting resin (e.g. the epoxy resin or the epoxy resin A), an average particle size of the thermoplastic resin B that the thermosetting resin composition of the present invention can further include is preferably not more than 200 μm.

From the perspective of obtaining excellent balance between mechanical properties (especially toughness), heat resistance, and solvent resistance, an amount of the thermoplastic resin B is preferably from 1 to 40 parts by mass per 100 parts by mass of the thermosetting resin.

From the perspective of obtaining excellent balance between mechanical properties (especially toughness), heat resistance, and solvent resistance, the amount of the thermoplastic resin B that the thermosetting resin composition of the present invention can further include is preferably from 1 to 40 parts by mass, more preferably from 5 to 40 parts by mass, and even more preferably from 10 to 30 parts by mass per 100 parts by mass of the thermosetting resin (the epoxy resin A included in the epoxy resin composition for a fiber-reinforced composite material).

The thermosetting resin composition of the present invention can further include a curing agent.

The curing agent that the thermosetting resin composition of the present invention can further include is not particularly limited. Examples thereof include conventionally known products.

Examples of a curing agent for epoxy resins include amine-based compounds such as 3,3'-diaminodiphenylsulfone, 4,4'-diaminodiphenylsulfone, imidazole compounds, and tetramethylguanidine; thiourea added amine; polyamide; polyol; polymercaptan; polycarboxylic acid; acid anhydride; carboxylic acid hydrazide; carboxylic acid amide; polyphenol compounds; novolak resins; and latent curing agents (e.g. ketimine and dicyandiamide).

Examples of curing agents for phenolic resins include hexamethylene tetramine, methylolmelamine, methylol urea, and the like.

A single curing agent can be used or a combination of two or more curing agents can be used.

From the perspective of obtaining excellent balance between mechanical properties (especially toughness), heat resistance, and solvent resistance, an amount of the curing agent is preferably from 0.5 to 1.2 equivalent weight and more preferably from 0.6 to 1.1 equivalent weight with respect to the thermosetting resin.

The thermosetting resin composition of the present invention can further include a solid resin D and/or an elastomer that is solid at room temperature. The solid resin D and/or the elastomer that is solid at room temperature is synonymous with that described hereinafter. The "solid resin D and/or the elastomer that is solid at room temperature" is sometimes referred to below as the "room temperature solid component". From the perspective of obtaining superior toughness and solvent resistance, an amount of the room temperature solid component is preferably from 1 to 20 parts by mass and more preferably from 3 to 15 parts by mass per 100 parts by mass of the thermosetting resin A.

The thermosetting resin composition (the epoxy resin composition for a fiber-reinforced composite material) of the present invention can further include additives, provided that the effectiveness of the composition of the present invention is not hindered. Examples of the additives include curing catalysts such as boron trifluoride/amine salt catalysts, solid rubber, fillers, antiaging agents, solvents, flame retardants, reaction retarders, antioxidants, pigments (dyes), plasticizers, thixotropic agents, UV absorbents, surfactants (including leveling agents), dispersants, dewatering agents, adhesion promoters, and anti-static agents.

A method of manufacturing the thermosetting resin composition of the present invention is described hereinafter.

A method of manufacturing the thermosetting resin composition of the present invention includes, for example:

a resin mixing process in which a solution including the thermosetting resin (the epoxy resin A), the thermoplastic resin C, and the filler, wherein the thermoplastic resin C phase separates from the thermosetting resin (epoxy resin A) at a temperature less than or equal to a UCST or greater than or equal to an LOST, is formed into a one-phase region mixed solution at a temperature exceeding the UCST or lower than the LOST; and an adsorption process in which the resin mixed solution is adjusted to a temperature less than or equal to the UCST or greater than or equal to the LOST, the thermoplastic resin C phase separates from the thermosetting resin (epoxy resin A) and the resin mixed solution becomes a two-phase region, and the phase separated thermoplastic resin C is adsorbed on the filler and becomes an adsorbing filler.

The resin mixing process is described below.

The resin mixing process is a process in which a solution including the thermosetting resin (the epoxy resin A), the thermoplastic resin C, and the filler, wherein the thermoplastic resin C phase separates from the thermosetting resin (epoxy resin A) at a temperature less than or equal to a UCST or greater than or equal to an LOST, is formed into a one-phase region mixed solution at a temperature exceeding the UCST or lower than the LOST.

The thermosetting resin (the epoxy resin A), the thermoplastic resin C, the filler, and the thermoplastic resin C that phase separates from the thermosetting resin at a temperature less than or equal to the UCST or greater than or equal to the LOST are synonymous with those described above.

From the perspective of obtaining excellent balance between mechanical properties (especially toughness), heat resistance, and solvent resistance, an amount of the filler used in the resin mixing process is preferably from 0.1 to 100 parts by mass, more preferably from 1 to 100 parts by mass, and even more preferably from 1 to 10 parts by mass per 100 parts by mass of the thermosetting resin (the epoxy resin A).

From the perspective of obtaining excellent balance between mechanical properties (especially toughness), heat resistance, and solvent resistance, an amount of the thermoplastic resin C used in the resin mixing process is preferably an amount per 100 parts by mass of the filler where an adsorption coefficient that is greater than 0 and less than or equal to 0.8, more preferably from 0.1 to 0.7, and even more preferably from 0.2 to 0.6, defined by Formula 1, is satisfied.

The mixed solution obtained via the resin mixing process includes the thermosetting resin (the epoxy resin A), the thermoplastic resin C, and the filler, and the thermosetting resin (the epoxy resin A) and the thermoplastic resin C form a one-phase region.

"One-phase region" refers to a state in which the thermosetting resin (the epoxy resin A) and the thermoplastic resin C are miscible.

In the resin mixing process, the mixed solution can be obtained by, for example, agitating the thermosetting resin (the epoxy resin A), the thermoplastic resin C, and the filler for 0.5 to 1.5 hours at a temperature that exceeds the UCST or is less than the LOST.

The adsorption process is described below.

The adsorption process is a process in which the resin mixed solution is adjusted to a temperature less than or equal to the UCST or greater than or equal to the LOST, the thermoplastic resin C phase separates from the thermosetting resin (epoxy resin A) and the resin mixed solution becomes a two-phase region, and the phase separated thermoplastic resin C is adsorbed on the filler and becomes an adsorbing filler.

"Two-phase region" refers to a state in which the resin mixed solution is phase separated into a component constituted mainly by the thermosetting resin (the epoxy resin A) and a component constituted mainly by the thermoplastic resin C.

The thermosetting resin composition obtained via the adsorption process (referred to as the "adsorbing filler mixture" when the thermosetting resin composition of the present invention further includes the curing agent) includes at least the thermosetting resin (the epoxy resin A) and the adsorbing filler.

In the adsorption process, the thermosetting resin composition (the adsorbing filler mixture when the thermosetting resin composition of the present invention further includes the curing agent; the adsorbing filler-containing mixture in the epoxy resin composition for a fiber-reinforced composite material) can be obtained by, for example, agitating the mixed solution for from 1 to 10 hours at a temperature that is less than or equal to the UCST or greater than or equal to the LCST.

In cases where the thermosetting resin composition of the present invention further includes the curing agent, a curing agent mixing process is further provided after the adsorption process in the method of manufacturing the thermosetting resin. The curing agent mixing process is a process in which the adsorbing filler mixture obtained in the adsorption process and the curing agent are mixed.

In the curing agent mixing process, from the perspective of suppressing the curing reaction, a temperature at which the adsorbing filler mixture and the curing agent are mixed is preferably as low a temperature as possible.

The method of mixing the adsorbing filler mixture and the curing agent is not particularly limited.

In the curing agent mixing process, the thermosetting resin composition can be obtained by adding the curing agent to the adsorbing filler mixture after adjusting the temperature as described above and, for example, agitating for 0.25 to 0.5 hours.

In cases where the thermosetting resin composition of the present invention further includes the thermoplastic resin B and/or the room temperature solid component, the thermoplastic resin B and/or the room temperature solid component can be added to the system after the adsorption process.

In cases where the thermosetting resin composition of the present invention further includes the thermoplastic resin B and/or the room temperature solid component and the curing agent, the thermoplastic resin B and/or the room temperature solid component can be added to the system after the adsorption process and, the curing agent mixing process can be performed thereafter.

Additionally, when a portion of the thermosetting resin is used in the resin mixing process, the remainder of the thermosetting resin can, for example, be added to the system together with the thermoplastic resin B and/or the room temperature solid component after the adsorption process.

The thermosetting resin composition (the epoxy resin composition for a fiber-reinforced composite material) of the present invention can be thermally cured. From the perspective of obtaining excellent balance between mechanical properties (especially toughness), heat resistance, and solvent resistance, a temperature when curing the thermosetting resin composition (the epoxy resin composition for a fiber-reinforced composite material) of the present invention is preferably from 120 to 210° C. and more preferably from 160 to 200° C.

From the perspective of obtaining high toughness, the morphology (morphology before curing or after curing) of the thermosetting resin composition of the present invention is preferably such that the adsorbing filler is dispersed in the thermosetting resin (i.e. a state in which the thermosetting resin forms a continuous phase and the adsorbing filler forms a dispersion phase). In cases where the thermosetting resin composition of the present invention further includes the thermoplastic resin B, the thermosetting resin and the thermoplastic resin B may form a bicontinuous phase. In cases where the thermosetting resin composition of the present invention further includes the room temperature solid component, the room temperature solid component can be dispersed in the thermosetting resin and/or the thermoplastic resin B.

From the perspective of being applicable as a structural material for automobiles and aircraft, a fracture toughness value measured in accordance with ASTM D5045-99 using the cured product obtained after curing the thermosetting resin composition of the present invention is preferably not less than 1.2 MPa·m$^{1/2}$ and more preferably not less than 1.5 MPa·m$^{1/2}$.

From the perspectives of obtaining greater toughness, and increasing peel strength (e.g. peel strength after self adhesion between a face plate such as a prepreg and another member (i.e. a honeycomb core)), a fracture toughness value measured in accordance with ASTM D5045-99 using the cured product obtained after curing the epoxy resin composition for a fiber-reinforced composite material is preferably not less than 1.8 MPa·m$^{1/2}$ and more preferably not less than 2.0 MPa·m$^{1/2}$.

A minimum viscosity of the thermosetting resin composition (the epoxy resin composition for a fiber-reinforced composite material) of the present invention, according to dynamic visco-elasticity measuring at a rate of temperature increase of 2° C./minute, is preferably from 1 to 100 Pa·s and more preferably from 5 to 40 Pa·s. From the perspective of attaining expression of production and self-adhesion of the prepreg, it is preferable that the minimum viscosity according to dynamic visco-elasticity measuring is within the range described above. If greater than or equal to 1 Pa·s, an excellent fillet can be formed and self-adhesion is enhanced. If less than or equal to 100 Pa·s, the resin composition can be easily impregnated into the reinforced fiber when fabricating the prepreg, while maintaining formability of the fillet.

Note that in the present invention, the minimum viscosity according to dynamic visco-elasticity measuring is a minimum value of complex viscosity found through dynamic visco-elasticity measuring, using the thermosetting resin composition (the epoxy resin composition for a fiber-reinforced composite material) of the present invention as a sample, under the following conditions: rate of temperature increase: 2° C./minute from 25° C. to 200° C.; frequency: 10 rad/second; and distortion: 1%.

From the perspective of obtaining superior application workability of resin films used in prepreg fabrication, a viscosity at 50° C. of the thermosetting resin composition (the epoxy resin composition for a fiber-reinforced composite material) of the present invention, according to dynamic visco-elasticity measuring at a rate of temperature increase of 2° C./minute, is preferably less than or equal to 5,000 Pa·s.

Note that in the present invention, the viscosity at 50° C. according to dynamic visco-elasticity measuring is a value at 50° C. of complex viscosity found through dynamic visco-elasticity measuring, using the thermosetting resin composition (the epoxy resin composition for a fiber-reinforced composite material) of the present invention as a sample, under the following conditions: rate of temperature increase: 2° C./minute from 25° C. to 200° C.; frequency: 10 rad/second; and distortion: 1%.

The cured product of the thermosetting resin composition (the epoxy resin composition for a fiber-reinforced composite material) of the present invention has superior solvent resistance. Examples of the solvents include methyl ethyl ketone and acetone.

An example of a preferable aspect is one in which the cured product obtained from the thermosetting resin composition (the epoxy resin composition for a fiber-reinforced composite material) of the present invention does not crack even after being immersed in the solvent (i.e. methyl ethyl ketone) at room temperature.

Examples of uses for the thermosetting resin composition (the epoxy resin composition for a fiber-reinforced composite material) of the present invention include matrices for prepregs, adhesives, primers, sealing materials, casting materials, sealants, coating materials, and the like.

Adherends on which the thermosetting resin composition (the epoxy resin composition for a fiber-reinforced composite material) of the present invention can be used are not particularly limited. Examples thereof include reinforced fibers such as carbon fiber, glass fiber, and aramid fiber; plastics; rubbers; glass; ceramics; concretes; mortars; metals such as aluminum alloys, titanium alloys, stainless steel alloys, and steel; and the like.

The thermosetting resin composition of the present invention or the thermosetting resin composition obtained via the method of manufacturing a thermosetting resin composition of the present invention can, for example, be used as a thermosetting resin composition for a fiber-reinforced composite material for a fiber-reinforced composite material.

An epoxy resin composition for a fiber-reinforced composite material that is an example of an aspect of the thermosetting resin composition of the present invention is described below.

The epoxy resin composition for a fiber-reinforced composite material is a compound including:

an epoxy resin A, a thermoplastic resin B, an adsorbing filler in which a thermoplastic resin C is adsorbed on a filler, and a curing agent, wherein an adsorption coefficient that is greater than 0 and less than or equal to 0.8, defined by Formula 1 below, is satisfied, and the morphology of a cured form thereof is such that at least the epoxy resin A forms a continuous phase and the adsorbing filler is dispersed in at least this continuous phase.

Adsorption coefficient=Amount (parts by mass) of the thermoplastic resin $C$ adsorbed on 100 parts by mass of the filler/specific gravity of the thermoplastic resin $C$/DBP oil absorption (mL/100 g) of the filler.                                                    Formula 1

The epoxy resin composition for a fiber-reinforced composite material is also referred to hereinafter as the "composition of the present invention".

The epoxy resin A is described below.

The epoxy resin A included in the epoxy resin composition for a fiber-reinforced composite material is not particularly limited, provided that it is a compound that has two or more epoxy groups. The epoxy resin A is synonymous with the epoxy resin A used as the thermosetting resin in the thermosetting resin composition of the present invention.

The thermoplastic resin B is described below.

The viscosity and thixotropy of the composition can be made appropriate as a result of the thermoplastic resin B being included in the epoxy resin composition for a fiber-reinforced composite material and, thereby, the epoxy resin composition for a fiber-reinforced composite material can form an excellent fillet, and a prepreg with superior self-adhesion can be obtained.

The thermoplastic resin B included in the epoxy resin composition for a fiber-reinforced composite material is not particularly limited. The thermoplastic resin B is the same as the thermoplastic resin B that the thermosetting resin composition of the present invention can further include.

From the perspective of obtaining excellent balance between mechanical properties (especially toughness), heat resistance, and solvent resistance, an amount of the thermoplastic resin B is preferably from 5 to 40 parts by mass and more preferably from 10 to 30 parts by mass per 100 parts by mass of the epoxy resin A.

A description of the adsorbing filler is given below.

Superior toughness and solvent resistance can be obtained, and thixotropy can be imparted to the composition, thus leading to resin flow being controllable, as a result of the adsorbing filler being included in the epoxy resin composition for a fiber-reinforced composite material. Additionally, the amount of the thermoplastic resin B can be suppressed and the superior solvent resistance can be obtained.

The adsorbing filler included in the epoxy resin composition for a fiber-reinforced composite material adsorbs the thermoplastic resin C on the filler. The adsorbing filler is the same as the adsorbing filler included in the thermosetting resin composition of the present invention.

A description of the filler is given below.

In the epoxy resin composition for a fiber-reinforced composite material, the filler used when producing the adsorbing filler is not particularly limited. The filler is the same as the filler used in the thermosetting resin composition of the present invention.

In the epoxy resin composition for a fiber-reinforced composite material, the thermoplastic resin C used when producing the adsorbing filler is not particularly limited. Examples thereof are the same as those listed for the thermoplastic resin B.

From the perspectives of obtaining superior mechanical properties (especially toughness), excellent balance between heat resistance and solvent resistance, and superior handling and workability, the thermoplastic resin B and the thermoplastic resin C are preferably the same. Additionally, for the same reasons, the thermoplastic resin B and the thermoplastic resin C preferably have the same form (e.g. molecular weight and functional group).

In the present invention, the adsorption coefficient defined by Formula 1 below is greater than 0 and less than or equal to 0.8.

Adsorption coefficient=Amount (parts by mass) of the thermoplastic resin $C$ adsorbed on 100 parts by mass of the filler/specific gravity of the thermoplastic resin $C$/DBP oil absorption (mL/100 g) of the filler.                                                    Formula 1

In the present invention, the "adsorption coefficient defined by Formula 1" is a value of a ratio of the volume of a thermosetting resin C that 100 parts by mass of a particular filler adsorbed to the volume of DBP that the same amount of the same filler could absorb.

Specifically, Formula 1 can be expressed as the following:

$$\text{Adsorption coefficient} = \frac{\left(\dfrac{\text{Amount of the thermoplastic resin } C \text{ adsorbed on 100 parts by mass of the filler}}{\text{Specific gravity of thermoplastic resin } C}\right)}{DBP \text{ oil absorption of the filler}} \quad \text{Formula 1}$$

A case where the adsorption coefficient is equal to 1 indicates a state in which a surface of the filler is completely covered by the thermoplastic resin C.

Cases where the adsorption coefficient is greater than 0 and less than or equal to 0.8 indicate a state in which the surface of the filler is partially covered by the thermoplastic resin C, and that the surface of the filler is not completely covered by the thermoplastic resin C. Thus, if the epoxy resin composition for a fiber-reinforced composite material is used, a thermosetting resin having superior toughness and solvent resistance can be obtained as the cured product.

From the perspective of obtaining excellent balance between mechanical properties (especially toughness), heat resistance, and solvent resistance, the adsorption coefficient is preferably from 0.1 to 0.7, and more preferably from 0.2 to 0.6.

From the perspectives of obtaining excellent balance between mechanical properties (especially toughness), heat resistance, and solvent resistance, and obtaining superior thixotropy, an amount of the thermoplastic resin C adsorbed on the filler is preferably an amount per 100 parts by mass of the filler where the adsorption coefficient is greater than 0 and less than or equal to 0.8, more preferably from 0.1 to 0.7, and even more preferably from 0.2 to 0.6.

A method of producing the adsorbing filler is not particularly limited. For example, the adsorbing filler can be produced by mixing the epoxy resin A (thermosetting resin), the thermoplastic resin C having an LOST with respect to the epoxy resin A, and the filler; combining the epoxy resin A and the thermoplastic resin C at a temperature lower than the LCST; and, thereafter, phase separating the thermoplastic resin C from the epoxy resin A at a temperature greater than or equal to the LCST; and adsorbing the separated thermoplastic resin C on the filler.

From the perspective of obtaining excellent balance between mechanical properties (especially toughness), heat resistance, and solvent resistance, the combining of the thermoplastic resin C having an LCST with respect to the epoxy resin A and the epoxy resin A is preferably a combination of at least one type of thermoplastic resin selected from the group consisting of polyethersulfone and polysulfone, and the epoxy resin A. The LCST can be adjusted to about 170° C. in a case (Working Example III) where from 10 to 25 parts by mass of a polyethersulfone thermoplastic resin C-1 and 70 parts by mass of a para-aminophenol-type trifunctional epoxy resin thermosetting resin a-1-1 are combined.

The curing agent is described below.

The curing agent included in the epoxy resin composition for a fiber-reinforced composite material is not particularly limited, provided that it can be used for epoxy resins. Examples thereof include conventionally known products. The curing agent is synonymous with the curing agent that the thermosetting resin composition of the present invention can further include.

From the perspective of obtaining excellent balance between mechanical properties (especially toughness), heat resistance, and solvent resistance, an amount of the curing agent is preferably from 0.5 to 1.2 equivalent weight and more preferably from 0.6 to 1.1 equivalent weight with respect to the epoxy resin A (however, in cases where the epoxy resin composition for a fiber-reinforced composite material further includes an epoxy resin d-1 as a solid resin D, a total weight of the epoxy resin A and the epoxy resin d-1).

From the perspective of obtaining superior toughness and solvent resistance, the epoxy resin composition for a fiber-reinforced composite material can further include a solid resin D and/or an elastomer that is solid at room temperature.

It is sufficient that the solid resin D is a resin that has high affinity with at least the epoxy resin A, and may be either a thermosetting resin or a thermoplastic resin. Moreover, a combination of both a thermosetting resin and a thermoplastic resin may be used.

A molecular weight of the solid resin D is preferably from 3,000 to 500,000. If the molecular weight is within the range from 3,000 to 500,000, the solid resin D can be completely melted and, as a result, can be uniformly dissolved when curing the epoxy resin composition for a fiber-reinforced composite material. Furthermore, the toughness of the epoxy resin composition for a fiber-reinforced composite material can be further enhanced as a result of the solid resin D being uniformly dispersed. Note that, in the present invention, "molecular weight" is a weight-average molecular weight expressed as a molecular weight of polystyrene, which is determined by gel permeation chromatography (GPC).

Examples of the thermosetting resin used as the solid resin D include the epoxy resin d-1, maleimide resins, cyanate resins, and resins having core shell structures. Of these, from the perspective of obtaining superior mixing workability with the epoxy resin A, the epoxy resin d-1 is more preferable.

The epoxy resin d-1 is not particularly limited, provided that it is a compound that has two or more epoxy groups. Examples thereof include bisphenol A-type epoxy resins, bisphenol F-type epoxy resins, phenol novolac-type epoxy resins, cresol novolac-type epoxy resins, dicyclopentadiene skeleton-based epoxy resins, and naphthalene skeleton-based epoxy resins.

Of these, from the perspective of obtaining superior toughness and solvent resistance, bisphenol A-type epoxy resins and bisphenol F-type epoxy resins are preferable.

From the perspective of obtaining superior toughness, the epoxy resin d-1 is preferably a high molecular weight epoxy resin, and more preferably is an epoxy resin having a weight-average molecular weight from 3,000 to 20,000. Because producing fine particles according to an impact-crushing method or the like is easy, and dissolving the particles in a hot mixing process when producing the epoxy resin composition for a fiber-reinforced composite material is easy, it is preferable that the weight-average molecular weight is within the range from 3,000 to 20,000.

From the perspective of obtaining superior toughness and solvent resistance, an epoxy equivalent weight of the epoxy resin d-1 is preferably from 1,000 to 5,000 g/eq and more preferably from 1,500 to 4,500 g/eq.

Additionally, in cases where the epoxy resin d-1 is a bisphenol A-type epoxy resin or a bisphenol F-type epoxy resin, from the perspective of obtaining superior toughness and solvent resistance, an epoxy equivalent weight of the bisphenol A-type epoxy resin or the bisphenol F-type epoxy resin is preferably from 1,000 to 5,000 g/eq and more preferably from 1,500 to 4,500 g/eq.

Because toughness will increase, it is preferable that the epoxy equivalent weight is greater than or equal to 1,000 g/eq. Because chemical resistance will be excellent, it is preferable that the epoxy equivalent weight is less than or equal to 5,000 g/eq.

Examples of the epoxy resin d-1 include phenoxy skeleton-based epoxy resins having an epoxy group at a molecule end. Affinity with the epoxy resin A can be increased by the phenoxy skeleton-based epoxy resin having an epoxy group at a molecule end.

From the perspectives of obtaining superior toughness, increasing affinity with the epoxy resin A, and raising the softening point, the phenoxy skeleton-based epoxy resin is preferably obtained using at least one selected from the group consisting of bisphenol A-type epoxy resins and bisphenol F-type epoxy resins.

A weight-average molecular weight of the phenoxy skeleton-based epoxy resin is preferably from 20,000 to 100,000 and more preferably from 40,000 to 80,000. Because producing fine particles according to an impact-crushing method or the like is easy, and dissolving the particles in a hot mixing process when producing the epoxy resin composition for a fiber-reinforced composite material is easy, it is preferable that the weight-average molecular weight of the phenoxy skeleton-based epoxy resin is within the range described above.

Additionally, an epoxy equivalent weight of the phenoxy skeleton-based epoxy resin is preferably from 5,000 to 30,000 g/eq and more preferably from 6,000 to 20,000 g/eq.

When the epoxy equivalent weight is adjusted to be greater than or equal to 5,000 g/eq, the phenoxy skeleton-based epoxy resin will not be completely miscible with the epoxy resin A after thermal curing, and it will be possible to form a dispersion phase in the continuous phase of the epoxy resin A after curing. When the epoxy equivalent weight is adjusted to be less than or equal to 30,000 g/eq, the phenoxy skeleton-based epoxy resin can be easily dissolved when hot mixing with the epoxy resin A.

The thermoplastic resin used as the solid resin D is not particularly limited. For example, from the perspective of obtaining superior toughness, a thermoplastic resin having a reactive functional group on an molecule end, that reacts with the epoxy resin A is preferable.

An example of a preferable aspect is one in which a form of the solid resin D is particulate because the solid resin D will completely dissolve in the epoxy resin A when hot mixing. An average particle size of the solid resin D is preferably not greater than 100 μm and more preferably from 5 to 100 μm. When the average particle size of the solid resin D is within the range described above, the solid resin D will easily dissolve in the epoxy resin A when a predetermined temperature is reached in a hot mixing process. Therefore, the viscosity of the epoxy resin composition for a fiber-reinforced composite material can be suitably adjusted, the solid resin D can be dispersed in the epoxy resin A phase, and the toughness of the cured product can be further increased.

A single solid resin D can be used or a combination of two or more solid resins D can be used.

A method of producing the solid resin D is not particularly limited. Examples thereof include conventionally known methods.

The elastomer is not particularly limited, and examples thereof include silicone elastomers.

From the perspective of obtaining superior dispersibility, an example of a preferable aspect is one in which a form of the elastomer is particulate. An average particle size of the elastomer is preferably not greater than 100 μm and more preferably from 0.1 to 100 μm.

A single elastomer can be used or a combination of two or more elastomers can be used. A method of producing the elastomer is not particularly limited. Examples thereof include conventionally known methods.

From the perspective of obtaining superior toughness and solvent resistance, an amount of the room temperature solid component is preferably from 1 to 20 parts by mass and more preferably from 3 to 15 parts by mass per 100 parts by mass of the epoxy resin A.

A method of manufacturing the epoxy resin composition for a fiber-reinforced composite material is described below.

The adsorbing filler included in the composition of the present invention may be applied to an object in a state in which the thermoplastic resin C (resin having toughness) is pre-deposited on the filler or, alternately, a technique may be used in which the thermoplastic resin C is adsorbed around the filler via resin phase separation when formulating or curing.

An example of a method of manufacturing the epoxy resin composition for a fiber-reinforced composite material is, for example, a method including: a resin mixing process in which a solution including the epoxy resin A, the thermoplastic resin C, and the filler, wherein the thermoplastic resin C phase separates from the epoxy resin A at a temperature less than or equal to a UCST or greater than or equal to an LOST, is formed into a one-phase region mixed solution at a temperature exceeding the UCST or lower than the LOST;

an adsorption process in which the resin mixed solution is adjusted to a temperature less than or equal to the UCST or greater than or equal to the LOST, the thermoplastic resin C phase separates from the epoxy resin A and the resin mixed solution becomes a two-phase region, the phase separated thermoplastic resin C is adsorbed on the filler and becomes an adsorbing filler, and an adsorbing filler-containing mixture including the adsorbing filler is obtained;

a thermoplastic resin B adding process in which a thermoplastic resin B is added to the adsorbing filler-containing mixture; and a curing agent mixing process in which the adsorbing filler-containing mixture and a curing agent are mixed, after the thermoplastic resin B adding process.

In cases where the epoxy resin composition for a fiber-reinforced composite material further includes the room temperature solid component, the room temperature solid component can be added to the system in the thermoplastic resin B adding process. Additionally, when a portion of the epoxy resin A is used in the resin mixing process, the remainder of the epoxy resin A can be added to the system together with the room temperature solid component in the thermoplastic resin B adding process.

The resin mixing process is synonymous with the resin mixing process in the method of manufacturing a thermosetting resin composition of the present invention. The adsorption process is synonymous with the adsorption process in the method of manufacturing a thermosetting resin composition of the present invention.

The thermoplastic resin B adding process is described below.

The thermoplastic resin B adding process is a process in which the thermoplastic resin B is added to the adsorbing filler-containing mixture obtained in the adsorption process. The thermoplastic resin B used is synonymous with that described above. A temperature at which the thermoplastic resin B adding process is performed is not particularly limited, and examples thereof include a range from 70 to 120° C.

The curing agent mixing process is described below.

The curing agent mixing process is a process in which the adsorbing filler mixture and the curing agent are mixed, after the thermoplastic resin B adding process. In the curing agent mixing process, from the perspective of suppressing the curing reaction, a temperature at which the adsorbing filler mixture and the curing agent are mixed is preferably as low a temperature as possible. The method of mixing the adsorbing filler mixture and the curing agent is not particularly limited. In the curing agent mixing process, the thermosetting resin composition can be obtained by adding the curing agent to the adsorbing filler mixture after adjusting the temperature as described above and, for example, agitating for from 0.25 to 0.5 hours.

The morphology of the epoxy resin composition for a fiber-reinforced composite material after curing is such that at least the epoxy resin A can form a continuous phase, and the adsorbing filler can be dispersed in at least the continuous phase of the epoxy resin A. Additionally, the epoxy resin A and the thermoplastic resin B may form a bicontinuous phase.

The adsorbing filler forms a fine dispersion phase in at least the continuous phase of the epoxy resin A and, as a result, stress concentration within the epoxy resin A phase can be dispersed and toughness can be increased. Because the toughness of the composition is increased, the strength of the fillet increases and, thus, the self-adhesive strength of the prepreg can be enhanced. Note that it is sufficient that the adsorbing filler is dispersed in at least the continuous phase of the epoxy resin A, and may be dispersed in the continuous phase of the thermoplastic resin B.

From the perspective of obtaining superior solvent resistance, an example of a preferable aspect is one in which the morphology is such that only the thermoplastic resin B does not form a continuous phase (that is, the sea-island structure morphology thereof is not reversed).

In cases where the epoxy resin composition for a fiber-reinforced composite material includes the solid resin D and/or the elastomer, after curing the composition, the morphology of the obtained cured product is such that at least the epoxy resin A can form a continuous phase, and the adsorbing filler and the solid resin D and/or the elastomer can be dispersed in at least the continuous phase of the epoxy resin A. Additionally, the epoxy resin A and the thermoplastic resin B may form a bicontinuous phase.

The solid resin D and/or the elastomer forms a fine dispersion phase in at least the continuous phase of the epoxy resin A and, as a result, stress concentration within the epoxy resin A phase can be dispersed and toughness can be further increased. Because the toughness of the composition is further increased, the strength of the fillet improves and, thus, the self-adhesive strength of the prepreg can be enhanced. Note that it is sufficient that the solid resin D and/or the elastomer is dispersed in at least the continuous phase of the epoxy resin A, and may be dispersed in the continuous phase of the thermoplastic resin B.

From the perspective of obtaining superior toughness and solvent resistance, in the cured product obtained after curing the composition, the average particle size of the solid resin D or the elastomer (as the domain) is preferably from 0.05 to 2 µm and more preferably from 0.1 to 0.5 µm.

In cases when the epoxy resin composition for a fiber-reinforced composite material is combined, as a matrix resin, with reinforced fiber, a prepreg having superior toughness and solvent resistance can be produced because the epoxy resin composition for a fiber-reinforced composite material becomes a cured product having superior toughness and solvent resistance. Additionally, a suitable fillet is easily formed and a prepreg having high self-adhering properties can be produced because the epoxy resin composition for a fiber-reinforced composite material is used.

Next, the prepreg of the present invention will be described below.

The prepreg of the present invention is obtained by combining the thermosetting resin composition for a fiber-reinforced composite material (epoxy resin composition for a fiber-reinforced composite material) of the present invention and reinforced fiber. The thermosetting resin composition for a fiber-reinforced composite material of the present invention uses the thermosetting resin composition of the present invention or the thermosetting resin composition obtained via the method of manufacturing a thermosetting resin composition of the present invention for a fiber-reinforced composite material.

Specifically, the prepreg of the present invention is obtained by impregnating reinforced fiber with the thermosetting resin composition for a fiber-reinforced composite material (the epoxy resin composition for a fiber-reinforced composite material) of the present invention. The matrix-use composition used in the prepreg of the present invention is not particularly limited, provided that it is the thermosetting resin composition for a fiber-reinforced composite material (the epoxy resin composition for a fiber-reinforced composite material) of the present invention.

The reinforced fiber used in the prepreg of the present invention is not particularly limited, and examples thereof include conventionally known products. Of these, from the perspective of strength, the reinforced fiber is preferably at least one selected from the group consisting of carbon fiber, glass fiber, and aramid fiber, and more preferably is carbon fiber.

Examples of the aramid fiber include Kevlar fiber.

The form of the fiber is not particularly limited, and examples thereof include roving, nonwoven, woven, tulle, and the like. While the optimal value varies based on the form and use thereof, the density of the fiber in cases of, for example, a carbon fiber woven is preferably from 150 to 400 g/m$^2$.

Examples of commercially available fibers include Carbon Fiber T-300 (manufactured by Toray Industries Inc.) and Carbon Fiber HTA (manufactured by Toho Rayon Co., Ltd.).

A method of manufacturing the prepreg of the present invention is not particularly limited. Examples thereof include wet methods using a solvent and hot-melt methods (solvent-free methods). From the perspective of being able to reduce drying time, an amount of the solvent used is preferably from 80 to 200 parts by mass per 100 parts by mass of the solid content of the thermosetting resin composition for a fiber-reinforced composite material (the epoxy resin composition for a fiber-reinforced composite material) of the present invention.

From the perspectives of obtaining excellent balance between mechanical properties (especially toughness), heat resistance, and solvent resistance, a content of the matrix resin in the prepreg of the present invention is preferably from 30 to 60 mass % of the prepreg.

Methods of use of the prepreg of the present invention are not particularly limited, and examples thereof include methods in which the prepreg of the present invention is cured as-is, and methods in which the prepreg of the present invention is semi-cured and then cured. The conditions when curing are the same as those described above.

Use of the prepreg of the present invention is not particularly limited. For example a conventionally known fiber-reinforced composite material can be obtained by curing the prepreg of the present invention. Specific examples of uses include aircraft parts (e.g. fairings, flaps, leading edges, floor panels, propellers, fuselages, and the like); two-wheel vehicle parts (e.g. motorcycle frames, cowls, fenders, and the like); automobile parts (e.g. doors, bonnets, tailgates, side fenders, side panels, fenders, energy absorbers, trunk lids, hard tops, side mirror covers, spoilers, diffusers, ski carriers, engine cylinder covers, engine hoods, chassis, air spoilers, propeller shafts, and the like); vehicle exterior plating (e.g. lead car noses, roofs, side panels, doors, truck bed covers, side skirts, and the like); railroad vehicle parts (e.g. luggage racks, seats, and the like); aero parts (e.g. side skirts and the like mounted on automobiles and rigid vehicles such as interior design elements, inner panels, outer panels, roofs, and floors of wings on wing trucks, and the like); use as housings (e.g. notebook computers, portable phones, and the like); medical uses (e.g. X-ray cassettes, table tops, and the like); audio product uses (e.g. flat speaker panels, speaker cones, and the like); sports goods uses (e.g. golf club heads, face masks, snowboards, surf boards, protectors, and the like); and general industrial uses (e.g. flat springs, windmill blades, and elevators (compartment panels, doors).

Additionally, a fiber-reinforced composite material can be fabricated by layering the prepreg of the present invention and another member (e.g. a honeycomb core). Examples of the fiber-reinforced composite material that can be fabricated by layering the prepreg of the present invention and another member include honeycomb sandwich panels.

As a result of using the thermosetting resin composition for a fiber-reinforced composite material (the epoxy resin composition for a fiber-reinforced composite material) of the present invention, the prepreg of the present invention has superior toughness and solvent resistance, has high self-adhesive strength, can form a fillet that has superior strength, and displays superior tacking, draping, productivity, and workability.

Additionally, the fiber-reinforced composite material that can be obtained from the prepreg of the present invention has superior toughness and solvent resistance, can be adhered to another member without using an adhesive, has superior prepreg smoothness, and has a superior appearance and surface properties in which porosity (unevennesses of the surface) is minimal.

Next, the honeycomb sandwich panel of the present invention will be described below.

The honeycomb sandwich panel of the present invention is obtained by layering and curing a honeycomb core and the prepreg of the present invention.

The prepreg used in the honeycomb sandwich panel of the present invention is not particularly limited, provided that it is the prepreg of the present invention. The prepreg used in the honeycomb sandwich panel of the present invention has superior adhesion and, therefore, can be adhered to the honeycomb core without using an adhesive, and can form a fillet having high strength.

Additionally, the honeycomb core used in the honeycomb sandwich panel of the present invention is not particularly limited. Examples thereof include at least one selected from the group consisting of aramid honeycombs, aluminum honeycombs, paper honeycombs, and glass honeycombs.

A size of the hexagonal column structural body of the honeycomb-like honeycomb core is not particularly limited but, from the perspectives of strength and reducing weight, a length of the cell size of the honeycomb core is preferably from ⅛ to ⅜ inches.

A method of producing the honeycomb sandwich panel of the present invention is not particularly limited.

An example of a method for producing the honeycomb sandwich panel of the present invention is described below while referencing the attached drawings.

Figure 2:
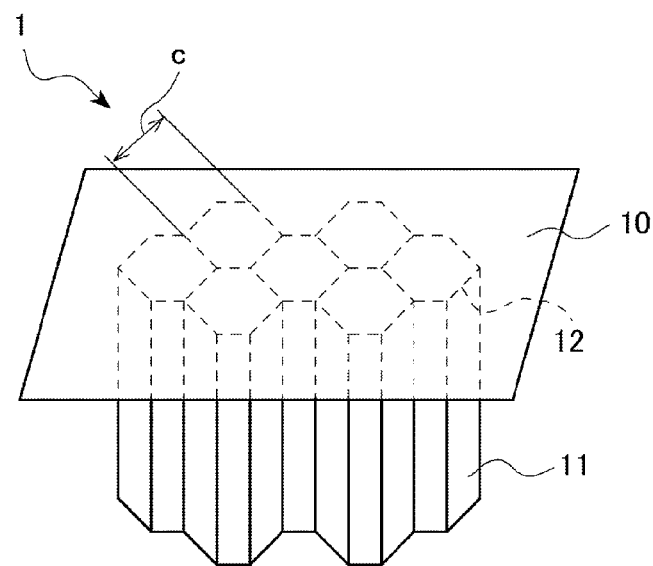
FIG. 2 is a perspective view schematically illustrating an example of a honeycomb sandwich panel of the present invention.

FIG. 2 is a perspective view schematically illustrating an example of a honeycomb sandwich panel of the present invention.

Figure 3:
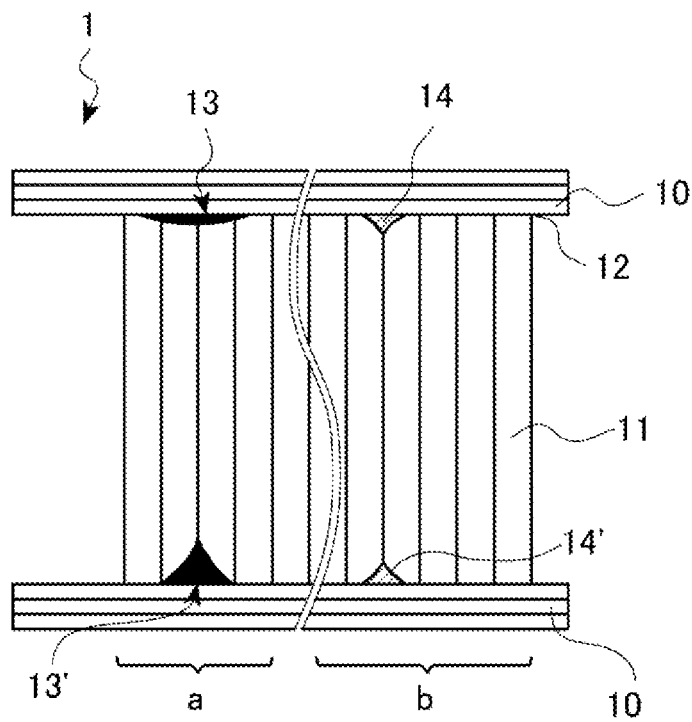
FIG. 3 is a cross-sectional view schematically illustrating an example of a cross-section of the honeycomb sandwich panel, cut parallel with a side face of the prism of a honeycomb core.

FIG. 3 is a cross-sectional view schematically illustrating an example of a cross-section of the honeycomb sandwich panel, cut parallel with a side face of the prism of a honeycomb core. Portion a in FIG. 3 is a honeycomb sandwich panel adhered to a prepreg formed using a conventional resin composition for prepreg sheets. Portion b in FIG. 3 is an example of the honeycomb sandwich panel of the present invention.

In FIG. 2, a honeycomb sandwich panel 1 is obtained by adhering a prepreg 10 to a honeycomb core 11. More specifically, the honeycomb sandwich panel 1 can be fabricated by bonding the prepreg 10 formed using the composition of the present invention to one or both ends 12 (example where bonded to both ends not illustrated) of the honeycomb core 11 having a honeycomb-like structure; and thermally curing using an autoclave or the like while contact bonding from both ends.

In FIG. 3, when using a prepreg in which a conventional composition has been used as the epoxy resin composition for a fiber-reinforced composite material, as illustrated in the portion a in FIG. 3, even if the prepreg 10 and the honeycomb core 11 are evenly contact bonded, when thermal curing, all of the epoxy resin composition for a fiber-reinforced composite material falls to a lower face portion 13', which may lead to the fillet not being formed on an upper face portion (not illustrated), or a gap 13 occurring at the adhesive face partially between the prepreg 10 and the honeycomb core 11.

In contrast, in cases where the composition of the present invention is used, as illustrated by the portion b of FIG. 3, bonding between the prepreg 10 and the honeycomb core 11 is complete and, moreover, a suitable amount of the composition can be maintained in the prepreg because the composition does not vacate the prepreg as a result of the epoxy resin composition for a fiber-reinforced composite material flowing out of the prepreg in excess.

Thus, curing can be completed while maintaining a suitable form of an upper portion fillet 14. Additionally, even on the lower face, when a decline in viscosity occurs, a lower portion fillet 14' can be formed due to surface tension, and curing can be completed while sufficiently retaining the epoxy resin composition for a fiber-reinforced composite material.

From the perspective of the heat resistance of the cured product, a heating temperature when bonding the prepreg 10 to the honeycomb core 11 is preferably from 160 to 200° C. and more preferably from 170 to 190° C.

Curing conditions when bonding the prepreg 10 to the honeycomb core 11 are as follows: rate of temperature increase: from 2 to 5° C./minute; pressure: from 2.5 to 4.0 kg/cm². An example of a preferable aspect is a method in which the temperature is raised to from 150 to 185° C., then this state of from 150 to 185° C. is maintained for from 1 to 2 hours and, thereafter, the temperature is lowered at a rate of 2 to 5° C./minute to room temperature.

The honeycomb sandwich panel of the present invention can be manufactured according to such a method.

The honeycomb sandwich panel of the present invention has superior fillet formability, fillet strength, mechanical strength, and workability.

The honeycomb sandwich panel of the present invention can, for example, be used as construction material for aircraft and automobiles.

EXAMPLES

Examples of the Thermosetting Resin Composition of the Present Invention

The present invention (thermosetting resin composition of the present invention) is described below in detail using examples but the present invention is not limited to these examples.

Evaluation

Each of the compositions obtained as described below were evaluated for their adsorption coefficient in Formula 1, cured resin toughness, and solvent resistance according to the following methods. The results thereof are shown in Tables 1 and 2.

1. Adsorption Coefficient

A sediment was obtained by subjecting 20 g of the adsorbing filler-containing mixture, obtained as described below, to separation using a centrifuge device at a speed of 19,000 (rpm) for one hour.

Next, the adsorbing filler was extracted by removing the thermosetting resin component included in the separated sediment by washing with methyl ethyl ketone (MEK). Amounts of the adsorbing filler extracted from 20 g of the adsorbing filler-containing mixture are shown in Table 1 and Table 2.

The extracted adsorbing filler was analyzed using a thermogravimetric (TGA) device, and the weight of the thermoplastic resin component ($W_{TP}$) and the weight of the filler ($W_F$) in the adsorbing filler were determined. The weight of the thermoplastic resin component ($W_{TP}$) and the weight of the filler ($W_F$) in the obtained adsorbing filler are shown in Table 1 and Table 2. Additionally, the adsorption coefficients of the adsorbing fillers of the examples were calculated using Formula 2 below. The adsorption coefficients of the adsorbing fillers of the examples are shown in Table 1 and Table 2.

$$\text{Adsorption coefficient} = \text{Amount of the thermoplastic resin adsorbed on 100 parts by mass of the filler / specific gravity of the thermoplastic resin / DBP oil absorption of the filler}$$

$$= \frac{\frac{100}{W_F} \times W_{TP}}{Ca_{TP}} \div DBP \quad \text{Formula 2}$$

In Formula 2, $W_{TP}$ is the weight (g) of the thermoplastic resin component in the adsorbing filler; $Ca_{TP}$ is the specific gravity of the thermoplastic resin; $W_F$ is the weight (g) of the filler in the adsorbing filler; and DBP is the DBP oil absorption (mL/100 g) of the filler.

2. Cured Resin Toughness ($K_{1C}$)

Each of the compositions obtained as described below were sandwiched in molds and put into a programmable oven. The temperature was raised from 70° C. to 200° C. at a rate of temperature increase of 2° C./minute. Then, each of the compositions were cured for two hours at 200° C. Thus, cured products having a thickness of 7 mm were fabricated. Fracture toughness values (stress intensity factor, unit: MPa·m$^{1/2}$) were measured from the obtained cured products in accordance with ASTM D-5045-99 under room temperature (25° C.) conditions. The obtained fracture toughness values are shown as the "cured resin toughness".

3. Solvent Resistance

The compositions obtained as described below were applied on slide glass as 10 mm square films having a thickness of 0.1 mm, and put into a programmable oven. The temperature was raised from 70° C. to 200° C. at a rate of temperature increase of 2° C./minute. Then, each of the compositions were cured for two hours at 200° C. Thus, cured products of each of the compositions, bonded on slide glass, were fabricated.

The cured products were completely immersed in methyl ethyl ketone while bonded to the slide glass and, after 90 minutes, were removed from the methyl ethyl ketone and dried. Then, the surface of the cured product was checked for the presence or absence of flaws using a light microscope. When no flaws were observed, solvent resistance of the cured product was evaluated as excellent.

4. Observation of the Adsorbing Filler

Each of the compositions obtained as described below were observed using a confocal microscope (trade designation: OPTELICS S130, manufactured by Lasertec Corporation; same hereinafter). The results are shown in FIG. 1.

5. Measurement Method of UCST and LCST

After mixing the thermosetting resin and the thermoplastic resin at the amounts (parts by mass) shown in Table 1 and Table 2 at 120° C. for one hour by agitating, vacuum degassing was performed at 80° C., and a transparent solution was obtained. The temperature was raised and lowered stepwise, 5° C. at a time, and the temperatures where cloudiness began to be observed in the system were designated as the UCST and the LCST, respectively.

Production of the Composition

The composition was produced according to the following method using the components shown in Table 1 and Table 2, at the amounts (unit: parts by mass) shown in Table 1 and Table 2.

1. Combining (1) When the Composition Includes the Curing Agent

First, the bisphenol A-type epoxy resin or the glycidyl ester epoxy resin (as the thermosetting resin), the filler, and the thermoplastic resin were placed in a container and mixed by agitation for one hour at 120° C. Thereafter, combining (the resin mixing process and the adsorption process) by agitation under the conditions of temperature and time shown in Table 1 and Table 2 was performed. Thus, the adsorbing filler-containing mixture was obtained.

After lowering the temperature of the adsorbing filler-containing mixture to 70° C. or lower, the curing agent was mixed and agitated into the adsorbing filler-containing mixture (the curing agent mixing process). Thus, the thermosetting resin composition was obtained.

(2) When the Composition does not Include the Curing Agent

The bisphenol A-type epoxy resin, the filler, and the thermoplastic resin were placed in a container and mixed by agitation for one hour at 120° C. Thereafter, combining (the resin mixing process and the adsorption process) by agitation under the conditions of temperature and time shown in Table 1 and Table 2 was performed. Thus, the adsorbing filler-containing mixture was obtained.

After lowering the temperature of the adsorbing filler-containing mixture to 85° C. or lower, the phenolic resin, benzoxazine resin, and curing catalyst were mixed and agitated into the adsorbing filler-containing mixture. Thus the thermosetting resin composition was obtained.

2. When Combining is not Performed

The thermosetting resin, the filler, and the thermoplastic resin were placed in a container and mixed by agitation for one hour at 120° C. Thus the composition was obtained.

After lowering the temperature of the obtained composition to 85° C. or lower, the phenolic resin, benzoxazine resin, and curing catalyst were, as necessary, mixed and agitated into the composition. Thus the thermosetting resin composition was obtained.

TABLE 1

| | | Working Examples I | | | | | | Comparative Examples I | | | |
|---|---|---|---|---|---|---|---|---|---|---|---|
| | | 1 | 2 | 3 | 4 | 5 | 6 | 1 | 2 | 3 | 4 |
| Thermosetting resin 1 | Bisphenol A-type epoxy | 100 | 100 | 100 | 100 | 100 | 100 | 100 | 100 | 100 | 100 |
| Thermosetting resin 2 | Phenolic resin | | 50 | | | | | | 50 | | |

TABLE 1-continued

Table 1

| | | Working Examples I | | | | | | Comparative Examples I | | | |
|---|---|---|---|---|---|---|---|---|---|---|---|
| | | 1 | 2 | 3 | 4 | 5 | 6 | 1 | 2 | 3 | 4 |
| Thermosetting resin 3 | Benzoxazine resin | | | 30 | | | | | | 30 | |
| Filler 1 | Fumed silica | 5 | 5 | 5 | | 5 | 5 | 5 | 5 | 5 | 5 |
| Filler 2 | Carbon black | | | | 10 | | | | | | |
| Thermoplastic resin 1 | Polyethersulfone | 30 | 30 | 30 | 30 | | | 30 | 30 | 30 | 30 |
| Thermoplastic resin 2 | Polyethersulfone (OH end) | | | | | | 30 | | | | |
| Thermoplastic resin 3 | Polyetherimide | | | | | 15 | | | | | |
| Curing agent | 3,3'-diaminodiphenyl sulfone | 30 | | | 30 | 30 | 30 | 30 | | | 30 |
| Curing catalyst | Triphenylphosphine | | 0.1 | | | | | | 0.1 | | |
| UCST (° C.) | | — | — | — | — | 50 | — | — | — | — | — |
| LCST (° C.) | | 150 | 150 | 150 | 150 | — | 150 | — | — | — | 150 |
| Resin mixing process | Resin mixing temperature (° C.) | 120 | 120 | 120 | 120 | 120 | 120 | 120 | 120 | 120 | 120 |
| Combining process | Performance of combining | Performed | Performed | Performed | Performed | Performed | Performed | Not performed | Not performed | Not performed | Performed |
| | Temperature when combining (° C.) | 180 | 180 | 180 | 180 | 40 | 180 | — | — | — | 180 |
| | Combining time (hr) | 1 | 1 | 1 | 1 | 10 | 1 | — | — | — | 4 |
| Adsorbing filler | Amount (g) of adsorbing filler in 20 g of adsorbing filler-containing mixture | 2.46 | 2.56 | 2.60 | 2.89 | 1.99 | 2.48 | 0.74 | 0.74 | 0.74 | 4.44 |
| | Weight of thermoplastic resin component in adsorbing filler ($W_{TP}$) (g) | 1.72 | 1.82 | 1.85 | 1.46 | 1.16 | 1.74 | 0 | 0 | 0 | 3.70 |
| | Weight of filler in adsorbing filler ($W_F$) (g) | 0.74 | 0.74 | 0.74 | 1.43 | 0.83 | 0.74 | 0.74 | 0.74 | 0.74 | 0.74 |
| | Adsorption coefficient | 0.48 | 0.51 | 0.52 | 0.71 | 0.31 | 0.49 | 0 | 0 | 0 | 1.04 |
| Cured resin toughness (K1c) | [unit: MPa√m] | 1.3 | 1.2 | 1.2 | 1.3 | 1.3 | 1.5 | 1.1 | 1.0 | 0.9 | 1.1 |
| Solvent resistance | | Excellent | Excellent | Excellent | Excellent | Excellent | Excellent | Poor | Poor | Poor | Poor |

The components shown in Table 1 are as follows.

Thermosetting resin 1 (bisphenol A-type epoxy): Bisphenol A-type diglycidyl ether; trade designation: jER828; manufactured by Japan Epoxy Resin Co., Ltd.

Thermosetting resin 2 (phenolic resin): Phenol novolac-type phenolic resin; trade designation: HF-1M; manufactured by Meiwa Plastic Industries, Ltd.

Thermosetting resin 3 (benzoxazine resin): Trade designation: F-a-type benzoxazine; manufactured by Shikoku Chemicals Corporation.

Filler 1 (fumed silica): Trade designation: Cab-O-Sil M5; manufactured by Cabot Corporation; DBP oil absorption: 350 mL/100 g; form: irregular Filler 2 (carbon black): Trade designation: Monarch 880; manufactured by Cabot Corporation; DBP oil absorption: 105 mL/100 g; form: irregular Thermoplastic resin 1 (polyethersulfone): Trade designation: SumikaExcel 4100P; manufactured by Sumitomo Chemical Company; specific gravity: 1.37 g/ml Thermoplastic resin 2 (polyethersulfone (OH end)): Polyethersulfone having a hydroxy group on an end thereof; trade designation: SumikaExcel 5003P; manufactured by Sumitomo Chemical Company; specific gravity: 1.37 g/ml Thermoplastic resin 3 (polyetherimide): Trade designation: Ultem 1000; manufactured by SABIC; specific gravity: 1.27 g/ml Curing agent (3,3'-diaminodiphenyl sulfone): Trade designation: Aradur 9719-1; manufactured by Huntsman International LLC.

Curing catalyst (triphenylphosphine): Trade designation: Hokuko TPP; manufactured by Hokko Chemical Industry Co., Ltd.

As is clear from the results shown in Table 1, toughness was low in Comparative Examples I-1 to 3 in which the combining was not performed and that did not include the adsorbing filler. Toughness was low in Comparative Example 1-4 in which the adsorption coefficient was greater than or equal to 1 or, rather, which included a filler, a surface of which was completely covered by the thermoplastic resin.

In contrast, toughness of Working Examples I-1 to 6 was superior and solvent resistance was superior.

TABLE 2

|  |  | Working Examples II | | | | Comparative Example II |
|---|---|---|---|---|---|---|
|  |  | 1 | 2 | 3 | 4 | 1 |
| Thermosetting resin 4 | Glycidyl ester-type epoxy | 100 | 100 | 100 | 100 | 100 |
| Filler 1 | Fumed silica | 5 | 5 | 5 | 5 | 5 |
| Thermoplastic resin 3 | Polyetherimide | 30 | 30 | 30 | 30 | 30 |
| Curing agent | 3,3'-diamino-diphenyl sulfone | 40 | 40 | 40 | 40 | 40 |
| UCST (° C.) |  | 100 | 100 | 100 | 100 | 100 |
| Resin mixing process | Resin mixing temperature (° C.) | 120 | 120 | 120 | 120 | 120 |
| Combining | Performance of combining | Performed | Performed | Performed | Performed | Performed |
|  | Temperature when combining (° C.) | 40 | 40 | 40 | 40 | 40 |
|  | Combining time (hr) | 1 | 2 | 4 | 8 | 20 |
| Adsorbing filler | Amount (g) of adsorbing filler in 20 g of adsorbing filler-containing mixture | 1.14 | 1.42 | 2.07 | 3.03 | 5.39 |
|  | Weight of thermoplastic resin component in adsorbing filler ($W_{TP}$) (g) | 0.40 | 0.68 | 1.32 | 2.29 | 4.65 |
|  | Weight of filler in adsorbing filler ($W_F$) (g) | 0.74 | 0.74 | 0.74 | 0.74 | 0.74 |
|  | Adsorption coefficient | 0.12 | 0.21 | 0.40 | 0.69 | 1.41 |
| Cured resin toughness (K1c) | [unit: MPa√m] | 1.2 | 1.4 | 1.6 | 1.4 | 1.0 |
| Solvent resistance |  | Excellent | Excellent | Excellent | Excellent | Poor |

The components shown in Table 2 are as follows.

Thermosetting resin 4 (glycidyl ester-type epoxy): Diglycidyl tetrahydrophthalate; trade designation: Araldite CY192-1; manufactured by Huntsman International LLC.

Filler 1 (fumed silica): Trade designation: Cab-O-Sil M5; manufactured by Cabot Corporation; DBP oil absorption: 350 mL/100 g; form: irregular Thermoplastic resin 3 (polyetherimide): Trade designation: Ultem 1000; manufactured by SABIC; specific gravity: 1.27 g/ml Curing agent (3,3'-diaminodiphenyl sulfone): Trade designation: Aradur 9719-1; manufactured by Huntsman International LLC.

As is clear from the results shown in Table 2, toughness was low in Comparative Example II-1 in which the adsorption coefficient defined by Formula 1 exceeded 0.8. In contrast, toughness of Working Examples II-1 to 4 was superior and solvent resistance was superior.

FIGS. 1A to 1E are described below.

FIGS. 1A to 1E are photographs taken of a mixture including an adsorbing filler-containing mixture obtained in the Working Examples, using a confocal microscope with a 10× objective lens. FIG. 1A corresponds to Working Example II-1, FIG. 1B corresponds to Working Example 11-2, FIG. 1C corresponds to Working Example 11-3, FIG. 1D corresponds to Working Example 11-4, and FIG. 1E corresponds to Comparative Example II-1. The unit of the scale shown in each photograph is μm.

In FIGS. 1A to 1E, reference numerals 101 to 105 represent the adsorbing filler, and reference numeral 106 represents the thermoplastic resin that was not adsorbed on the filler.

As is clear from the results shown in FIGS. 1A to 1E, it is observed in FIGS. 1A to 1D that the adsorbing filler 101 to 104 is dispersed in the thermosetting resin (not illustrated). In contrast, in FIG. 1E, it is observed that the adsorbing filler 105 has agglomerated and is not dispersed in the thermosetting resin (not illustrated) and, furthermore, that the thermoplastic resin 106 that has not completely adsorbed on the filler has agglomerated.

Examples of the Thermosetting Resin Composition for a Fiber-Reinforced Composite Material (the Epoxy Resin Composition for a Fiber-Reinforced Composite Material) of the Present Invention Next, examples are set forth in which a specific description of the thermosetting resin composition for a fiber-reinforced composite material (the epoxy resin composition for a fiber-reinforced composite material) of the present invention is given. However, the present invention is not limited to such examples.

Evaluation

Each of the compositions obtained as described below were evaluated for their resin viscosity, cured resin toughness ($K_{1C}$), honeycomb panel peel strength, solvent resistance, thixotropy, and LCST. The results are shown in Table 3.

1. Adsorption Coefficient

A sediment was obtained by subjecting 20 g of the adsorbing filler-containing mixture (intermediate product), obtained as described below, to separation using a centrifuge device at a speed of 19,000 (rpm) for one hour. Next, the adsorbing filler was extracted by removing the thermosetting component included in the separated sediment by washing with methyl ethyl ketone (MEK). Amounts of the adsorbing filler extracted from 20 g of the adsorbing filler-containing mixture are shown in Table 3.

The extracted adsorbing filler was analyzed using a thermogravimetric (TGA) device, and the weight of the thermoplastic resin component C ($W_{TP}$) and the weight of the filler ($W_F$) in the adsorbing filler were determined. The weight of the thermoplastic resin component C ($W_{TP}$) and the weight of the filler ($W_F$) in the obtained adsorbing filler are shown in Table 3. Additionally, the adsorption coefficients of the adsorbing fillers of the examples were calculated using Formula 2 below. The adsorption coefficients of the adsorbing fillers of the examples are shown in Table 3.

$$\text{Adsorption coefficient} = \frac{\text{Amount of the thermoplastic resin adsorbed on 100 parts by mass of the filler}}{\text{specific gravity of the thermoplastic resin}} \div \text{DBP oil absorption of the filler}$$

$$= \frac{\frac{100}{W_F} \times W_{TP}}{Ca_{TP}} \div DBP$$

Formula 2

In Formula 2, $W_{TP}$ is the weight (g) of the thermoplastic resin C in the adsorbing filler; $Ca_{TP}$ is the specific gravity of the thermoplastic resin C; $W_F$ is the weight (g) of the filler in the adsorbing filler; and DBP is the DBP oil absorption (mL/100 g) of the filler.

2. Resin Viscosity

Using the epoxy resin composition for a fiber-reinforced composite material obtained as described below as a sample, viscosity at 50° C. was measured and the minimum value of complex viscosity found through dynamic visco-elasticity measuring was measured under the following conditions: rate of temperature increase 2° C./minute from 25° C. to 200° C.; frequency: 10 rad/second; distortion 1%.

3. Cured Resin Toughness ($K_{1C}$)

Each of the compositions obtained as described below were formed on release paper as resin boards having a thickness of 7 mm and put into an autoclave. The temperature was raised from 70° C. to 180° C. at a rate of temperature increase of 2° C./minute. Then, each of the compositions were cured for two hours at 180° C. under 0.32 MPa pressure. Thus, cured products having a thickness of 7 mm were fabricated.

Fracture toughness values (stress intensity factor, unit: $MPa \cdot m^{1/2}$) were measured from the obtained cured products in accordance with ASTM D-5045-99 under room temperature (25° C.) conditions. The obtained fracture toughness values are shown as cured resin toughness.

4. Honeycomb Panel Peel Strength

Two layers of a prepreg fabricated using the composition obtained as described below and carbon fiber woven into a plain weave form as the reinforced fiber (T300-3000, manufactured by Toray Industries Inc.; density 198 g/m²) were layered. This prepreg was disposed on both faces of a honeycomb core (Nomex honeycomb SAH-1/8-8.0, manufactured by Showa Aircraft Industry Co., Ltd.), then placed in a bag and cured by heating in an autoclave at a temperature of 180° C. for two hours (rate of temperature increase: 2.8° C./minute). Thus a honeycomb panel was fabricated. During the curing, the autoclave was pressurized to an internal pressure of 0.32 MPa.

After the thermal curing process, peel strength (lb-in/3 in) at a temperature of 23° C. (dry state) of a sample of the obtained honeycomb panel was measured in accordance with ASTM D1781, where each of the face boards disposed on the upper side (Bag side: face contacting the vacuum bag) and the lower side (Tool side: face contacting the molding jig) of the honeycomb core were machined to predetermined dimensions.

5. Solvent Resistance

A two-layer laminate of the same prepreg used in the honeycomb peel strength test was put into an autoclave. The temperature was raised from 70° C. to 180° C. at a rate of temperature increase of 2° C./minute. Then, curing was performed at a pressure of 0.32 MPa and a temperature of 180° C. for two hours. Thus a 0.5 mm×25 mm×50 mm (thickness× width×length) laminate cured product was fabricated. This laminate cured product was immersed in methyl ethyl ketone for 90 minutes at a temperature of 25° C. and then was removed from the solvent. Thereafter, the condition of the surface of the cured product was observed using a light microscope.

Cases where there was no change from prior to immersion were evaluated as "○", cases where minor cracking was observed on the surface were evaluated as "Δ", and cases where significant cracking was observed on the surface were evaluated as "x".

6. Measurement Method of LCST

After mixing the thermosetting resin a-1-1 and the thermoplastic resin C-1 at the amounts (parts by mass) shown in Table 3 at 120° C. for one hour by agitating, vacuum degassing was performed at 80° C., and a transparent solution was obtained. The temperature was raised stepwise, 5° C. at a time, and the temperature where cloudiness began to be observed in the system was designated the LCST.

Production of the Composition

The composition was produced according to the following method using the components shown in Table 3, at the amounts (unit: parts by mass) shown in Table 3.

1. Combining

First, the epoxy resin a-1-1, the filler, and the thermoplastic resin C were placed in a container and mixed by agitation for one hour at 120° C. Thereafter, combining (the resin mixing process and the adsorption process) by agitation for one hour at 180° C. was performed. Thus, the adsorbing filler-containing mixture (intermediate product) was obtained. Furthermore, the temperature was returned to 120° C., and the epoxy resin a-2-1, the epoxy resin a-1-2, the thermoplastic resin B, the epoxy resin d-1-1, and the epoxy resin d-1-2 were added and mixed by agitation for one hour. Thus, the adsorbing filler-containing mixture was obtained.

After lowering the temperature of the adsorbing filler-containing mixture to 70° C. or lower, the curing agent was mixed and agitated into the adsorbing filler-containing mixture (the curing agent mixing process). Thus, the epoxy resin composition for a fiber-reinforced composite material was obtained.

In Comparative Example III-1, the epoxy resin a-1-1 and the filler 1 were mixed by agitating for one hour at a temperature of 180° C., carried out the same as the combining. 20 g were sampled from the obtained mixture and subjected to the same centrifugation that was performed in the evaluation of the adsorption coefficient described above.

2. When Combining is not Performed

The epoxy resin A, the filler, and the thermoplastic resin B were placed into a container and mixed by agitation for one hour at a temperature of 120° C. After cooling the mixture to 70° C. or lower, the curing agent was added. Thus the composition was obtained.

TABLE 3

| | | | Working Examples III | | | Comparative Examples III | | |
|---|---|---|---|---|---|---|---|---|
| | | | 1 | 2 | 3 | 1 | 2 | 3 |
| Epoxy resin A | Epoxy resin a-1-1 | Para-aminophenol-type trifunctional epoxy resin | 70 | 70 | 70 | 70 | 70 | 70 |
| | Epoxy resin a-2-1 | Bisphenol F-type bifunctional epoxy resin | 30 | 30 | | 30 | 30 | 30 |
| | Epoxy resin a-1-2 | Resorcinol-type bifunctional epoxy resin | | | 30 | | | |
| Thermoplastic resin B-1 | | Polyethersulfone | 20 | 20 | 10 | 40 | 45 | 48 |
| Thermoplastic resin C-1 | | Polyethersulfone | 15 | 10 | 25 | | | |
| Filler 1 | | Fumed silica | 3 | 3 | 3 | 3 | | |
| Solid resin D | Epoxy resin d-1-1 | Phenoxy skeleton-based epoxy resin | 10 | 10 | | 10 | | |
| | Epoxy resin d-1-2 | Bisphenol A-type bifunctional epoxy resin | | | 10 | | 15 | |
| Curing agent | Curing agent 1 | 3,3'-diaminodiphenyl sulfone | 34 | 34 | 34 | 34 | 34 | 34 |
| | Curing agent 2 | Dicyandiamide | 2 | 2 | 2 | 2 | 2 | 2 |
| LCST | | (° C.) | 170 | 170 | 170 | — | — | — |
| Combining | | Performance of combining | Performed | Performed | Performed | Performed | Not performed | Not performed |
| Adsorbing filler | | Amount (g) of adsorbing filler in 20 g of adsorbing filler-containing mixture | 2.26 | 1.83 | 2.69 | 0 | 0 | 0 |
| | | Weight of thermoplastic resin component C in adsorbing filler ($W_{TP}$) (g) | 1.58 | 1.11 | 2.08 | — | — | — |
| | | Weight of filler in adsorbing filler ($W_F$) (g) | 0.68 | 0.72 | 0.61 | — | — | — |
| | | Adsorption coefficient | 0.48 | 0.32 | 0.71 | 0 | — | — |
| Resin viscosity | Viscosity at 50° C. | [Pa · s] | 4412 | 1892 | 2025 | 3291 | 4827 | 3356 |
| | Minimum viscosity | [Pa · s] | 48 | 26 | 20 | 39 | 31 | 18 |
| Cured resin toughness (K1c) | | [MPa√m] | 2.1 | 1.8 | 1.9 | 1.8 | 2.2 | 1.9 |
| Honeycomb panel peel strength | Bag side, average | [lb-in/3 in] | 27.1 | 19.9 | 21.1 | 18.4 | 28 | 23 |
| | Tool side, average | [lb-in/3 in] | 25.2 | 21.3 | 20.5 | 19.5 | 27.8 | 19.8 |
| Solvent resistance | | | ○ | ○ | ○ | Δ | × | × |

The components shown in Table 3 are described in detail in Table 4.

TABLE 4

| | | Product name | Compound name | Manufacturer |
|---|---|---|---|---|
| Epoxy resin A | Epoxy resin a-1-1 | MY-0510 | Para-aminophenol-type trifunctional epoxy; 700 mPa · s @ 25° C. | Huntsman |
| | Epoxy resin a-2-1 | YDF-170 | Bisphenol F-type bifunctional epoxy; 3500 mPa · s @ 25° C. | Tohto Kasei |
| | Epoxy resin a-1-2 | EX-201 | Resorcinol-type bifunctional epoxy; 250 mPa · s @ 25° C. | Nagase ChemteX |
| Thermoplastic resin B-1 | | PES5003P | Polyethersulfone | Sumitomo Chemical |
| Thermoplastic resin C-1 | | PES5003P | Polyethersulfone (for covering the filler) | Sumitomo Chemical |
| Filler 1 | | Cab-O-Sil M5 | Fumed silica filler | Cabot |

TABLE 4-continued

Table 4

|  |  | Product name | Compound name | Manufacturer |
|---|---|---|---|---|
| Solid resin D | Epoxy resin d-1-1 | YP-70 | Phenoxy skeleton-based epoxy resin | Tohto Kasei |
|  | Epoxy resin d-1-2 | YD-020N | Bisphenol A-type bifunctional epoxy; 100 µm or smaller crushed product with melting point from 135 to 150° C. | Tohto Kasei |
| Curing agent | Curing agent 1 | Aradur 9719-1 | 3,3'-diaminodiphenyl sulfone | Huntsman |
|  | Curing agent 2 | DICY-15 | Dicyandiamide | Japan Epoxy Resin |

Note that the DBP oil absorption of the filler 1 is 350 mL/100 g, and a form thereof is irregular.

It is clear from the results shown in Table 3 that solvent resistance was inferior and toughness was low in Comparative Examples III-1 to 3 that did not include the adsorbing filler. In Comparative Example III-1, the thermoplastic resin was not used when combining and, therefore, the adsorbing filler did not exist, regardless of performing the operations as when combining.

In contrast, toughness and solvent resistance of Working Examples III-1 to 3 was superior.

Additionally, in Working Examples III-1 to 3, the morphology after curing was such that at least the epoxy resin A formed a continuous phase and the adsorbing filler was dispersed in at least said continuous phase.

As described above, because the adsorbing filler was included, it was possible to attain toughness equivalent to that attained via a conventional method in which an amount from 40 to 50 parts by mass of a thermoplastic resin B is added to 100 parts by mass of an epoxy resin A.

With a resin in which a large amount of the thermoplastic resin B is compounded, the thermoplastic resin forms a continuous phase after curing and this portion is prone to deterioration when immersed in a solvent. However, with the epoxy resin composition for a fiber-reinforced composite material, it is difficult for the thermoplastic resin to form a continuous phase and, therefore, resistance to solvents is high.

The thermosetting resin composition for fiber-reinforced composite material (epoxy resin composition for a fiber-reinforced composite material) according to the present invention has low viscosity in the range of working (e.g. 100° C. or lower), and has workability, not only when manufacturing a prepreg, but also after forming the prepreg (tack, drape) that is superior to formulated systems in which a large amount of thermoplastic resin is added. Moreover, molding defects when curing (voids) do not easily occur.

By utilizing the effects of the adsorbing filler, it is unnecessary to maintain the minimum viscosity of the resin higher than required, and matrix combination at a level where workability is not sacrificed is possible.

REFERENCE NUMERALS

101 to 105 Adsorbing filler
106 Thermoplastic resin not adsorbed on the filler
1 Honeycomb sandwich panel
10 Reinforced fiber prepreg
11 Honeycomb core
12 End
13 Gap
13' Lower face portion
14 Upper portion fillet
14' Lower portion fillet
a Conventional honeycomb sandwich panel
b Honeycomb sandwich panel of the present invention
c Cell size

What is claimed is:

1. A thermosetting resin composition comprising: a thermosetting resin and an adsorbing filler in which a thermoplastic resin C is adsorbed on a filler; wherein wherein the thermoplastic resin C comprises polyethersulfone, and an adsorption coefficient that is greater than 0 and less than or equal to 0.8, defined by Formula 1 below, is satisfied:

$$\text{Adsorption coefficient} = \{\text{Amount (parts by mass) of the thermoplastic resin } C \text{ adsorbed on 100 parts by mass of the filler/specific gravity of the thermoplastic resin } C\}/DBP \text{ oil absorption (mL/100 g) of the filler.} \quad \text{Formula 1}$$

2. A thermosetting resin composition for fiber-reinforced composite material comprising the thermosetting resin composition described in claim 1.

3. A prepreg obtained by combining reinforced fiber and the thermosetting resin composition for fiber-reinforced composite material described in claim 2.

4. A honeycomb sandwich panel obtained by layering and curing a honeycomb core and the prepreg described in claim 3.

5. The thermosetting resin composition according to claim 1, wherein the thermosetting resin comprises an epoxy resin.

6. The thermosetting resin composition according to claim 1, wherein a form of the filler is at least one selected from the group consisting of spherical, granular, and irregular.

7. The thermosetting resin composition according to claim 1, wherein the thermoplastic resin C comprises a functional group that reacts with the thermosetting resin.

8. The thermosetting resin composition according to claim 1, wherein an amount of the adsorbing filler is from 0.1 to 100 parts by mass per 100 parts by mass of the thermosetting resin.

9. The thermosetting resin composition according to claim 1, wherein the DBP oil absorption is from 10 to 1000 mL/100 g.

10. The thermosetting resin composition according to claim 1, wherein the adsorbing filler is dispersed in the thermosetting resin.

11. The thermosetting resin composition according to claim 1, further comprising a curing agent.

12. A method of manufacturing the thermosetting resin composition described in claim 11, comprising: a resin mixing process in which a solution comprising the thermosetting resin, the thermoplastic resin C, and the filler, wherein the thermoplastic resin C phase separates from the thermosetting resin at a temperature less than or equal to a UCST or greater than or equal to an LCST, is formed into a one-phase region mixed solution at a temperature exceeding the UCST or lower than the LCST;

an adsorption process in which the resin mixed solution is adjusted to a temperature less than or equal to the UCST or greater than or equal to the LCST, the thermoplastic resin C phase separates from the thermosetting resin and the resin mixed solution becomes a two-phase region, the phase separated thermoplastic resin C is adsorbed on the filler and becomes an adsorbing filler, and an adsorbing filler mixture including the adsorbing filler is obtained; and a curing agent mixing process in which the adsorbing filler mixture and the curing agent are mixed.

13. A thermosetting resin composition for fiber-reinforced composite material comprising the thermosetting resin composition obtained by the method described in claim 12.

14. A method of manufacturing the thermosetting resin composition described in claim 11, comprising: a resin mixing process in which the thermosetting resin, the thermoplastic resin C, and the filler are formed into a one-phase region mixed solution at a temperature exceeding the UCST or lower than the LCST;

an adsorption process in which the resin mixed solution is adjusted to a temperature less than or equal to the UCST or greater than or equal to the LCST, the thermoplastic resin C phase separates from the thermosetting resin and the resin mixed solution becomes a two-phase region, the phase separated thermoplastic resin C is adsorbed on the filler and becomes an adsorbing filler, and an adsorbing filler mixture including the adsorbing filler is obtained; and a curing agent mixing process in which the adsorbing filler mixture and the curing agent are mixed.

15. The thermosetting resin composition according to claim 1, further comprising a thermoplastic resin B.

16. The thermosetting resin composition according to claim 15, wherein the thermoplastic resin B comprises a functional group that reacts with the thermosetting resin.

17. The thermosetting resin composition according to claim 1, wherein the thermosetting resin is an epoxy resin A and, furthermore, comprises a thermoplastic resin B and a curing agent.

18. The thermosetting resin composition according to claim 1, further comprising a solid resin D and/or an elastomer that is solid at room temperature.

19. A method of manufacturing the thermosetting resin composition described in claim 1, comprising: a resin mixing process in which a solution comprising the thermosetting resin, the thermoplastic resin C, and the filler, wherein the thermoplastic resin C phase separates from the thermosetting resin at a temperature less than or equal to a UCST or greater than or equal to an LCST, is formed into a one-phase region mixed solution at a temperature exceeding the UCST or lower than the LCST; and an adsorption process in which the resin mixed solution is adjusted to a temperature less than or equal to the UCST or greater than or equal to the LCST, the thermoplastic resin C phase separates from the thermosetting resin and the resin mixed solution becomes a two-phase region, and the phase separated thermoplastic resin C is adsorbed on the filler and becomes an adsorbing filler.

20. A thermosetting resin composition for fiber-reinforced composite material comprising the thermosetting resin composition obtained by the method described in claim 19.

21. A method of manufacturing the thermosetting resin composition described in claim 1, comprising: a resin mixing process in which the thermosetting resin, the thermoplastic resin C, and the filler are formed into a one-phase region mixed solution at a temperature exceeding the UCST or lower than the LCST; and an adsorption process in which the resin mixed solution is adjusted to a temperature less than or equal to the UCST or greater than or equal to the LCST, the thermoplastic resin C phase separates from the thermosetting resin and the resin mixed solution becomes a two-phase region, and the phase separated thermoplastic resin C is adsorbed on the filler and becomes an adsorbing filler.

\* \* \* \* \*